United States Patent
Max

(10) Patent No.: US 7,094,341 B2
(45) Date of Patent: Aug. 22, 2006

(54) HYDRATE-BASED DESALINATION/PURIFICATION USING PERMEABLE SUPPORT MEMBER

(75) Inventor: Michael David Max, St. Pete Beach, FL (US)

(73) Assignee: Marine Desalination Systems, L.L.C., Washington, DC (US)

( * ) Notice: Subject to any disclaimer, the term of this patent is extended or adjusted under 35 U.S.C. 154(b) by 0 days.

(21) Appl. No.: 11/089,369

(22) Filed: Mar. 25, 2005

(65) Prior Publication Data

US 2005/0194299 A1 Sep. 8, 2005

Related U.S. Application Data

(62) Division of application No. 10/429,765, filed on May 6, 2003.

(60) Provisional application No. 60/378,368, filed on May 8, 2002.

(51) Int. Cl.
*C02F 1/02* (2006.01)

(52) U.S. Cl. .......................... 210/170; 62/3.2; 62/123; 62/238.5; 210/177; 210/181; 210/182; 210/202; 210/205

(58) Field of Classification Search .............. 62/238.5; 210/177, 180
See application file for complete search history.

(56) References Cited

U.S. PATENT DOCUMENTS

| | | | |
|---|---|---|---|
| 1,727,504 A * | 9/1929 | Gibson | ........................ 210/180 |
| 2,475,255 A | 7/1949 | Rollman | |
| 2,990,691 A | 7/1961 | Glasgow | |
| 3,132,096 A * | 5/1964 | Walton | ........................ 210/711 |
| 4,162,617 A * | 7/1979 | Schmidt et al. | ................ 62/123 |
| 4,453,959 A | 6/1984 | Bishkin | |
| 4,678,583 A | 7/1987 | Willson, III et al. | |
| 4,776,177 A | 10/1988 | Jancic et al. | |
| 5,630,865 A | 5/1997 | Price | |
| 5,964,923 A | 10/1999 | Lokhandwala | |
| 6,028,234 A | 2/2000 | Heinemann et al. | |
| 6,145,340 A | 11/2000 | Stepanski et al. | |
| 6,158,239 A | 12/2000 | Max et al. | |
| 6,158,242 A | 12/2000 | Lu | |
| 6,350,928 B1 | 2/2002 | Waycuilis et al. | |
| 6,395,138 B1 * | 5/2002 | Darredeau et al. | .......... 202/158 |
| 6,502,404 B1 * | 1/2003 | Arman et al. | ................. 62/3.1 |
| 6,562,234 B1 * | 5/2003 | Max | ........................... 210/170 |
| 6,673,249 B1 * | 1/2004 | Max | ........................... 210/747 |
| 6,703,534 B1 | 3/2004 | Waycuilis et al. | |

(Continued)

FOREIGN PATENT DOCUMENTS

JP 11 319805 11/1999

(Continued)

Primary Examiner—Peter A. Hruskoci
(74) Attorney, Agent, or Firm—Kenneth M. Fagin, Esq.

(57) ABSTRACT

Processes and apparatus are disclosed for separating and purifying aqueous solutions such as seawater by causing a substantially impermeable mat of gas hydrate to form on a porous restraint. Once the mat of gas hydrate has formed on the porous restraint, the portion of the mat of gas hydrate adjacent to the restraint is caused to dissociate and flow through the restraint, e.g., by lowering the pressure in a collection region on the opposite side of the restraint. The purified or desalinated water may then be recovered from the collection region. The process may be used for marine desalination as well as for drying wet gas and hydrocarbon solutions. If conditions in the solution are not conductive to forming hydrate, a heated or refrigerated porous restraint may be used to create hydrate-forming conditions near the restraint, thereby causing gas hydrates to form directly on the surface of the restraint.

69 Claims, 14 Drawing Sheets

U.S. PATENT DOCUMENTS

| | | |
|---|---|---|
| 6,767,388 B1 | 7/2004 | Lecomte et al. |
| 6,774,246 B1 | 8/2004 | Reuter et al. |
| 6,830,682 B1 * | 12/2004 | Max .......................... 210/170 |
| 6,866,750 B1 * | 3/2005 | Gougel et al. ................ 203/10 |
| 6,946,017 B1 | 9/2005 | Leppen |

FOREIGN PATENT DOCUMENTS

| | | |
|---|---|---|
| WO | WO 01/010541 A1 | 2/2001 |
| WO | WO 02/00553 A2 | 1/2002 |

* cited by examiner

HYDRATE-BASED DESALINATION/PURIFICATION USING PERMEABLE SUPPORT MEMBER

CROSS-REFERENCE TO RELATED APPLICATIONS

This is a divisional of application Ser. No. 10/429,765 filed May 6, 2003, the entire contents of which are incorporated by reference. This application claims the benefit of provisional U.S. patent application Ser. No. 60/378,368 filed May 8, 2002, the contents of which are incorporated by reference.

GOVERNMENTAL SUPPORT AND INTEREST

This invention was made with Government support under Contract No. NBCHC 010003 dated Jan. 29, 2001 and issued by the Department of the Interior—National Business Center (DARPA). The Government has certain rights in the invention.

BACKGROUND AND FIELD OF THE INVENTION

In general, the invention relates to gas hydrate-based desalination and/or water purification. In particular, the invention significantly reduces the amount of residual brine that mixes with the product water, thereby greatly enhancing the purity of the product water.

Purified water may be obtained from saline or polluted water by forming and then dissociating crystalline hydrate. Such a process for obtaining purified water from saline or polluted water is disclosed in, for example, U.S. Pat. Nos. 5,873,262 and 3,027,320. According to those patents, a gas or mixture of gases is brought into contact with saline or polluted water under appropriate conditions of pressure and temperature and forms hydrate. The hydrate is then brought to a region of higher temperature and lower pressure, where it dissociates to release fresh water and the hydrate-forming gas or gases.

When the hydrate is formed in saltwater to desalinate it, highly saline brines typically remain in the interstices of the hydrate as it forms a slurry. These brines may also contain dissolved or suspended solids.

One of the principal problems that has inhibited the successful development of hydrate-based desalination on a commercial scale has been the difficulty of removing such residual, interstitial brines from the hydrate slurry or a hydrate-brine mixture. In particular, it has proven difficult to develop a successful process for thoroughly washing an essentially static mixture of hydrate and interstitial brines, in which process the saline interstitial fluid is removed (and perhaps replaced by less saline interstitial water).

According to the two patents noted above, the hydrate, which is positively buoyant, simply floats upward from where it forms (a region of highly saline water) into a region of less saline water. The hydrate dissociates in the region of less saline water, while residual brine remains in or sinks toward the region of highly saline water. The region of less saline water may be maintained at the reduced salinity levels by introducing fresh water released upon dissociation of the hydrate. Such moving of hydrate, or allowing of hydrate to move, into a region of less saline water minimizes undesirable mixing of "purified" water with interstitial water and is particularly well suited to large-scale production of fresh water. However, variable amounts of highly saline residual fluid still enters the region of hydrate dissociation, which increases the salinity in the dissociation region and thus reduces the "purity" of the product water.

In addition to research on using hydrates for desalination/purification, much of the hydrate research to date has been conducted by energy companies concerned with inhibiting hydrate formation and growth in hydrocarbon pipelines because hydrate-caused flow constrictions in such pipelines can be extremely costly. Moreover, even if hydrate does not cause a flow constriction, small crystals of hydrate may form in petroleum, which crystals act as abrasive crystals in the moving fluid. Therefore, it is desirable to remove hydrate from pipelines and other hydrocarbon-containing vessels, even if the hydrate occurs only in small quantities.

Prior energy industry research efforts have yielded a number of methods for inhibiting hydrate growth or for removing unwanted hydrate from piping. However, existing methods involve high capital costs, high energy demands, and in some cases, the use of chemicals (such as alcohols) which absorb the water from petroleums but which create their own separation problems. If drying of petroleums is carried out on the seafloor in deep water, costs are magnified.

SUMMARY OF THE INVENTION

The invention provides various methods and apparatuses for extracting fresh water from saline or otherwise polluted water with greatly increased purity of the final, product water that is obtained. The invention entails forming a substantially solid, compacted mat of gas hydrate (or other clathrate, if fluid other than water is used) on or against a porous, fluid-permeable restraint. Residual saline interstitial fluid is expelled from the mat of hydrate by the forces governing hydrate crystallization. Hydrate within the portions of the mat that are closest to or adjacent to the restraint are caused or allowed to dissociate, e.g., by lowering system pressure on the side of the restraint that is opposite to the mat of hydrate. That reduced pressure or "suction" acts on the hydrate through the pores in the restraint. Purified water (or other fluid if the process is used to form clathrates of fluid other than water) and the hydrate-forming gas (or clathrate-forming gas) pass through the restraint via the pores in the restraint and are collected from the side of the restraint opposite the mat of hydrate. Because the residual fluids remaining after the hydrate has been formed (e.g., the highly saline residual brines) have been expelled from the mat, the product water (or other product fluid) passing through the restraint is substantially free of salts, other dissolved materials, or contaminants. Thus, purity of the product water is significantly increased as compared to the prior art.

Under steady state conditions, operation of the system is controlled such that hydrate forms and accumulates on one surface of the mat of hydrate at the same rate as it dissociates from the opposite surface of the mat, adjacent to the restraint. Thus, a substantially uniform mat of hydrate of essentially constant thickness can be maintained, and the process of the invention can be run on a continuous basis.

The gas hydrate used in the process may be any gas hydrate formed under typical hydrate-forming pressure and temperature conditions, as known in the art. Moreover, in the context of the invention, "fresh" water is water that is substantially less saline and contains substantially fewer dissolved chemical species than the water from which the gas hydrate was formed, for example, water that contains less than 500 TDS (total dissolved solids). Such fresh water may be either pure or potable.

The porous and permeable restraint can be made from, for example, a highly thermally conducting, relatively stiff metal, plastic, ceramic, or synthetic material. Examples of suitable materials from which the porous, permeable restraint can be made include steel plate, a supported metal or plastic screen, or a composite material having hydrophobic and hydrophilic areas such that hydrate adheres to the material but water can readily pass through the material. The porous and permeable restraint, also referred to herein as a "hydrate asymmetric restraint" or simply "restraint," is configured such that it allows fluid and gas to pass through it. (The term "asymmetric" in "hydrate asymmetric restraint" refers to the different (i.e., "asymmetric") pressure conditions that exist on either side of the restraint when a system according to the invention is operating at steady state.)

Additionally, the restraint also may have a series of conduits (e.g., internal, extending between the pores of the restraint) or cavities (e.g., formed in its surface) through which cooling and/or heating fluids circulate or in which cooling or heating apparatus can be installed. Cooling and/or heating facilitate hydrate formation (e.g., during system startup) or dissociation (i.e., by providing sufficient heat required for the hydrate to dissociate by "compensating" for heat of exothermic formation of the hydrate that has been carried away from the system, e.g., by residual brines.

The restraint can be formed in a number of different configurations, depending, for example, on whether it is desired to operate using positively or negatively buoyant hydrate. Systems using a hydrate asymmetric restraint can be mechanically or "artificially" pressurized in order to generate pressures necessary for hydrate to form. Alternatively, apparatus using an asymmetric restraint can be submerged, e.g., at the bottom of a shaft of depth sufficient for the weight of the column of water above the restraint to generate appropriate operating pressures or in an open-ocean marine environment.

BRIEF DESCRIPTION OF THE DRAWINGS

These and other features of the invention will become clearer in view of the following description and the figures, in which.

DETAILED DESCRIPTION OF EMBODIMENTS OF THE INVENTION

Figure 1:
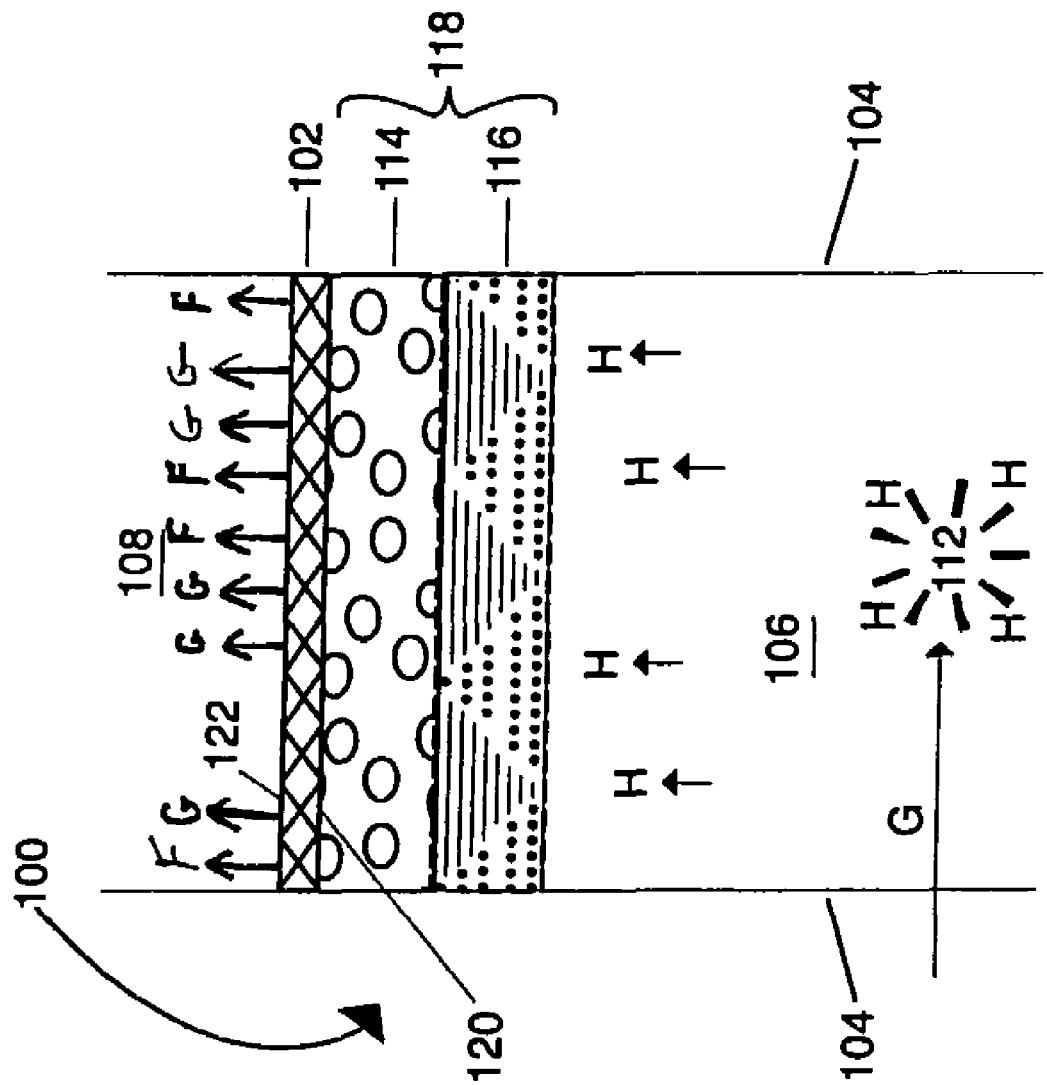
FIG. 1 is a generalized, diagrammatic section view illustrating a hydrate asymmetric restraint for practicing methods of the present invention.

As shown in FIG. 1, general apparatus 100 according to the invention and having a hydrate asymmetric restraint 102 includes a vessel 104, the walls of which contain the hydrate and the fluid from which it is formed. The vessel 104 may be a conventional pressure vessel such as a steel or aluminum tank, or any other vessel capable of withstanding typical hydrate-forming temperatures and pressures.

Hydrate-forming temperatures and pressures are known in the art and generally range from about 1° C. to about 30° C., with pressures ranging from ambient pressure (about 0.1 MPa) to about 10 MPa, depending on the particular hydrate-forming gas being used. (Processes and apparatuses according to the invention may be adapted to use any available hydrate-forming gas or mixture of hydrate-forming gases.) As is known in the art, forming hydrate at higher temperatures generally requires the use of higher pressures. Many types of hydrate-forming gases are known in the art, including but not limited to low molecular weight hydrocarbon gases (e.g., methane, ethane, and propane), carbon dioxide, sulfur trioxide, nitrogen, halogens, noble gases, and sulfur hexafluoride.

The vessel 104 has appropriate inlet and outlet ports (not shown) for introducing and removing gas and water. Additionally, the vessel 104 may have suitably reinforced, transparent observation ports, also not shown, by means of which operation of the vessel can be visually monitored. The size and relative dimensions of the vessel 104 are determined largely by the physico-chemical characteristics of the particular hydrate-forming gas or gas mixture as well as the volume output of fresh water to be produced.

Figure 2:
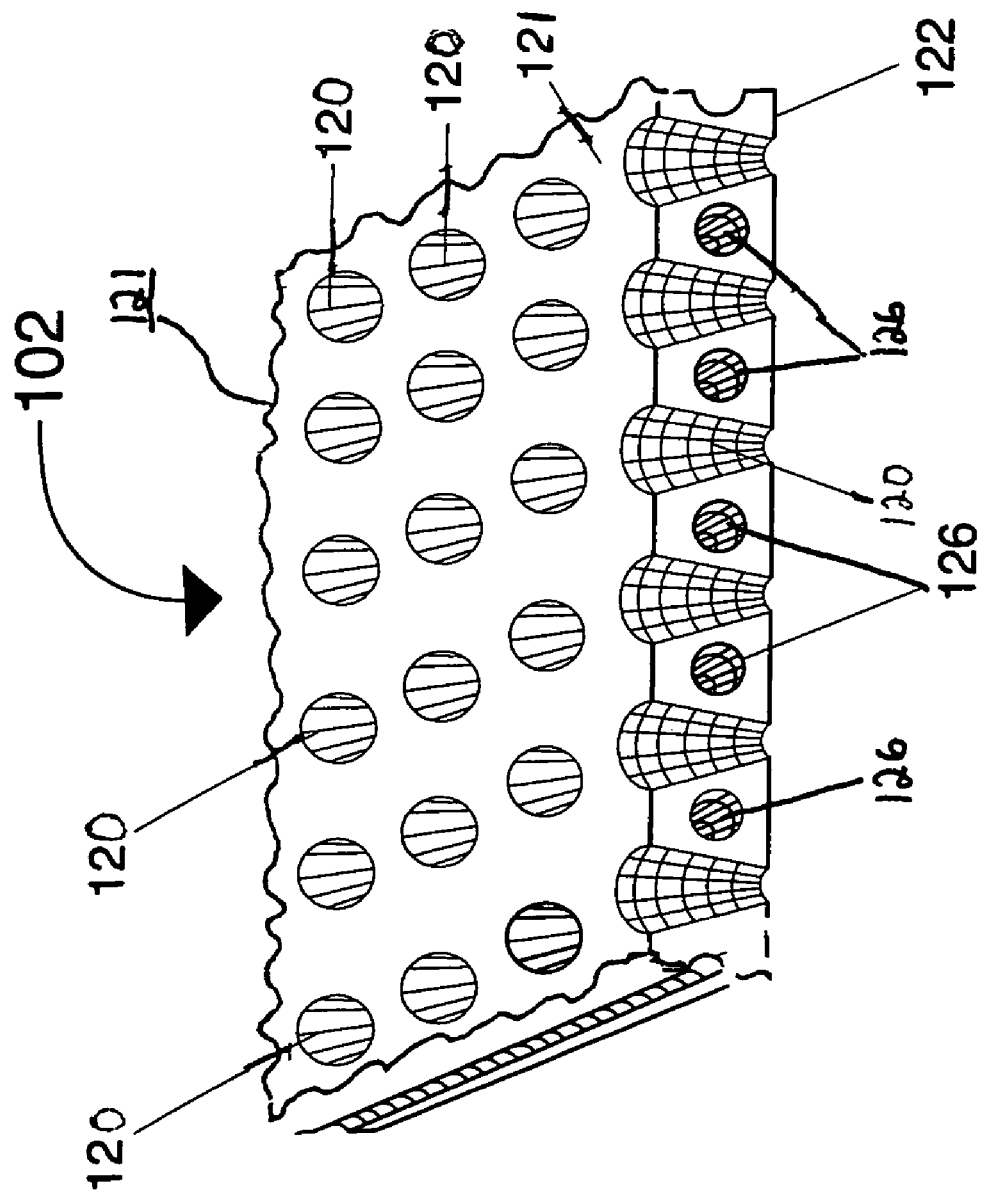
FIG. 2 is a detailed perspective view, partially in section, of a portion of the hydrate, asymmetric restraint illustrated in FIG. 1.

The hydrate asymmetric restraint 102 illustrated in FIGS. 1 and 2 is a porous, stainless steel plate or other suitably strong, non-corrosive material. The restraint 102 has a porosity of about 80%, with an average pore size of about 2.5 mm. In other embodiments, the porosity of the restraint 102 may be between about 75% and about 95%, with a pore size between about 1 mm and about 5 mm. The pore size may be varied depending on the thickness of the hydrate layer that is to be formed in the restraint, with smaller pores used when a thinner layer of hydrate is to be formed on the restraint and larger pores used when a thicker layer of hydrate is to be formed on the restraint.

The pores 120 in the restraint 102 may be cylindrical, or they may have some other shape. For example, as shown in FIG. 2, the pores 120 in the restraint 102 may have a conical cross-sectional shape, with the pores decreasing in diameter from the high-pressure, hydrate formation side 121 toward the low-pressure-exposed side 122. Such diminishing-diameter configuration helps prevent solid fragments of hydrate from "blowing through" the restraint 102, i.e., from moving from the high-pressure or "upstream" side of the restraint 121 to the low-pressure or "downstream" side of the restraint 122.

The restraint 102 is securely connected to the walls of the vessel 104 by means of fasteners (e.g., bolts, screws, or rivets), a weldment, or any other conventional connecting means. Alternatively, depending on the size and characteristics of the vessel 104, the restraint 102 may be molded or cast as an integral part of the vessel 104. In other embodiments, other materials may be used for the restraint 102 and vessel 104, such other materials including aluminum, brass, plastics, and composites. The material of the restraint 102 and vessel 104 should be chosen such that the components do not corrode with extended exposure to a saline environment. The restraint 102 is constructed with sufficient size and thickness to resist stresses of approximately 150–300 pounds per square inch without failure.

The restraint 102 separates a relatively high-salinity, hydrate formation region 106 from a fresh water collection region 108 of lower salinity. Hydrate-forming gas G is supplied to the hydrate formation region 108 and, because pressure and temperature conditions within the hydrate formation region 106 are conducive to forming hydrate, free hydrate (generally indicated as 112 when newly formed) spontaneously forms.

Apparatus 100 is configured for use with positively buoyant hydrate. Thus, the newly formed hydrate 112 may be either naturally positively buoyant per se or, alternatively, formed in a manner such that there is enough trapped hydrate-forming gas so as to be positively buoyant in toto even though the hydrate, per se, is negatively buoyant. As illustrated by arrows H, the newly formed hydrate 112 floats upward toward the restraint 102, where it accumulates and compacts.

The apparatus 100 is illustrated in FIG. 1 as operating under steady state conditions after a mat of hydrate 114 has formed on the restraint 102. Under steady state conditions, a substantially solid mat of hydrate 114 will be "clotted" against the restraint 102. Just beneath the substantially solid mat of hydrate 114, a generally granular zone or layer of hydrate 116, the porosity of which decreases toward the solid mat of hydrate 114, is formed. Together, the substantially solid mat of hydrate 114 and granular zone or layer of hydrate 116 form a pressure-sealing barrier layer 118 that substantially seals the pores of the restraint 102. Newly formed hydrate 112 rises into contact with and joins the granular layer of hydrate 116, and the generally granular layer of hydrate 116 slowly becomes compacted into the generally solid mat of hydrate 114. As the granular hydrate compacts into the generally solid mat 114, residual, highly saline interstitial brines will be expelled or displaced (downward in the embodiment illustrated in FIG. 1), thus producing a mat 114 that is substantially pure hydrate, i.e., free of brines or other contaminants.

Portions of the mat of hydrate 114 that are adjacent to the restraint 102 (i.e., on the side of the mat 114 opposite to that where hydrate accumulates) will dissociate under the influence of lower pressure conditions established in the fresh water collection region 108. In particular, those portions of the mat of hydrate 114 will be subjected to the lower pressure of the fresh water collection region 108 through the pores of the restraint 102, and the lower pressure is such that the hydrate in those low-pressure-exposed portions of the mat 114 no longer remain stable. Therefore, it will dissociate.

As the hydrate in the portions of the mat 114 adjacent the restraint 102 dissociates, the constituent fresh water F and hydrate-forming gas G are released from the hydrate and flow through the pores 120 of the restraint 102 and into the fresh water collection region 108, while the interstitial, highly saline residual brines are substantially (i.e., virtually entirely) left behind in the hydrate formation region 106 because they have been expelled by compaction of the granular layer 116 into the mat 114. Thus, far purer product water (or other fluid from which clathrate can be formed) can be produced by means of the present invention than has been produced by means of prior art methodologies.

Under steady state operating conditions, new hydrate 112 joins the granular layer 116 at the same rate that hydrate dissociates from the opposite surface of the mat of hydrate 114, thereby maintaining the existence and integrity of the sealing or barrier layer 118 and thus the pressure seal created by it. Therefore, hydrate formation region 106 can be maintained at a higher pressure than the fresh water collection region 108; alternatively stated, the fresh water collection region 108 can be maintained at a lower pressure than the hydrate formation region 106. The pressure differential between the hydrate formation region 106 and the fresh water collection region 108 is controlled so as to cause as much fresh water as possible to flow into the fresh water collection region 108 under steady state conditions without causing the pressure sealing layer 118 or the restraint 102 to fracture or otherwise fail mechanically.

Although as a whole the mat of hydrate 114 is substantially solid in the steady state, the hydrate itself is usually initially deposited (e.g., during system start-up) on the restraint 102 in an incomplete manner such that the deposits of hydrate on the restraint 102 are not completely solid hydrate; rather, they are able to change shape without recrystallizing. If all of the hydrate 112 in the mat were solid and therefore unable to change shape without recrystallizing, small holes might form in the hydrate mat through which residual saline water from the hydrate formation region 106 could pass. However, hydrate formation that prevents gas from coming into contact with water will generally yield substantially complete sealing of the restraint 102.

In particular, hydrate shells commonly form around bubbles of hydrate-forming gas, which prevents all of the hydrate-forming gas in the bubble from forming hydrate. Thus, the bubbles tend to be "soft" in that they change shape and flatten somewhat when they come into contact with the restraint 102. When these hydrate-shelled gas bubbles (which often become encrusted with acicular and tabular crystals of hydrate that grow both outward from the shells into the surrounding water and into the gas bubbles) are strained sufficiently, they fracture, thereby releasing gas into the surrounding water as well as allowing water to enter the existing hydrate-shell. Both events cause more hydrate to form spontaneously, which substantially reduces the remaining porosity of the hydrate mat and causes residual water to move away from such secondarily formed hydrate.

Thus, the original, "soft" bubbles carry hydrate-forming gas and hydrate into the immediate vicinity of the restraint 102, and interstitial residual water fluid is gradually displaced away from the restraint 102, first by the hydrate-shelled gas bubbles deforming as they press into the open pores of the restraint 102 and then by the "secondary" formation of more hydrate as the shells fracture. As this process continues, the pores of the restraint 102 gradually will become blocked or clogged. While some of the pores in the restraint 102 are still unblocked, residual water will be expelled away from the restraint 102 as the growing or thickening mat of hydrate (which is growing towards the hydrate formation region 106) pushes the residual water towards the hydrate formation region 106. Eventually, all (or almost all) of the pores in the asymmetric restraint facing the hydrate formation region 106 will become clogged or clotted with hydrate such that the mat of hydrate 114 and the restraint 102 form a pressure seal or pressure barrier between the hydrate formation region 106 and the fresh water collection region 108.

Forming hydrate shells around gas bubbles also has the benefit of increasing the buoyancy of hydrate which, per se, is positively buoyant so that it will exert more force against the restraint 102 when it comes into contact with the restraint, thus increasing the tendency to "squeeze out" pore space. Similarly, when gas bubbles are formed or trapped within hydrate which, per se, is negatively buoyant so as to form a "soft" hydrate bubble that will deform against an asymmetric restraint, the hydrate mat, in toto, will be positively buoyant. Although the buoyancy of the resultant gas/hydrate mixture in a bubble of hydrate which, per se, is negatively buoyant is not as great as that of a gas/hydrate mixture formed from positively buoyant hydrate (for similar volumes of included gas), such bubbles will, nonetheless, join the solid mat of hydrate 114 and be held there by intergrowth with other hydrate already present in the mat of hydrate 114. The mat of hydrate 114 will be held against the restraint 102 by virtue of the pressure differential across it (as well as by virtue of the hydrate's buoyancy where the hydrate, per se, is positively buoyant).

In addition to the formation of hydrate within the hydrate formation region 106 and, secondarily, at the face of the restraint 102, more dynamic recrystallization will occur within the mat of hydrate 114 as a result of forces created within the hydrate by the significant pressure differential across the mat of hydrate 114. For example, when the pressure in the hydrate forming region 106 is about 1.7 MPa (about 17 bar) with a water temperature of 8.5° C., and a mixed hydrate-forming gas comprising methane with about 5% propane is used to form the hydrate, the pressure in the fresh water collection region 108 may be maintained at between about 1 MPa and about 1.2 MPa (10 to 12 bar). The actual pressures in the hydrate forming region 106 and fresh water collection region 108 will vary depending on the particular type of hydrate-forming gas being used and the temperature of the input water, and the pressure on the dissociation side will depend on the desired rate of dissociation for a particular apparatus and for particular operating conditions. Irrespective of the actual pressures employed, however, the strain induced in the mat of hydrate 114 is likely to be strongly asymmetric.

In the forming mat of hydrate 114, the axis of maximum strain typically will be approximately normal to the restraint 102 because of the different pressures on either side of the restraint 102, and the axes of minimum and intermediate strain will lie in a plane approximately parallel with the restraint 102. Therefore, compressive strains will arise in a plane approximately normal to the plane of the restraint 102, and extensive strains will arise in a plane approximately parallel to the restraint 102. Such a strain field will cause differential stresses on the individual grains of hydrate within the mat of hydrate 114, and such differential stresses will cause the mat of hydrate 114 to compress even further against the clotted restraint 102, thereby displacing additional interstitial fluid away from the restraint 102. (It is believed that this effect is attributable to annealing recrystallization and grain boundary minimalization that accompany recrystallization of polycrystalline accumulations under conditions of anisotropic strain.) Typically, the hydrate will tend to recrystallize in a lateral direction, away from the axis of maximum strain and along the plane in which the axes of minimum and intermediate strain lie.

The strain couple within the hydrate immediately proximate to the surface of the restraint 102 (i.e., where the hydrate is dissociating) will be different from that within the region of the mat of hydrate 114 where hydrate is deforming and recrystallizing. Because the hydrate dissociates only at the surface of the mat of hydrate 114 (or in small fissures that extend from the surface into the interior of the mat 114), it is believed that there will be little or no accompanying recrystallization of the hydrate under the new strain field. However, even if there were some recrystallization within the new strain field, the relative degree of salinity of the water produced from that recrystallized hydrate would likely be unaffected because porosity and permeability of the solid hydrate mat are essentially eliminated in the early stages of formation of the hydrate mat 114.

When gas inclusions remain within the mat of hydrate 114, the gas typically will pass through the restraint 102 when the hydrate around it dissociates (along with fresh water produced when the hydrate dissociates). As individual grains or bubbles of hydrate are subjected to the low pressure proximate to the surface of the restraint 102 (as well as the high pressure in the hydrate formation region 106, acting through the hydrate mat 114), the grains of hydrate will tend to crush, and gas will tend to escape through the restraint 102. This may have a slight effect on the overall efficiency of the process because additional gas may need to be delivered to the hydrate formation region 106 to replace that which has escaped. The relative efficiency of the process, however, will have little (if any) effect on the salinity of water produced by the process.

As noted above, under steady state operating conditions, hydrate will accumulate on one surface of the mat of hydrate 114 at the same rate as hydrate dissociates from the opposite surface of the mat 114 (i.e., from the surface adjacent the restraint 102), and this rate balance maintains the integrity of the pressure sealing layer 118 formed by the clotted restraint 102 and the mat of hydrate 114. Once the pressure sealing layer 118 has been formed completely (i.e., at the end of the start-up phase of operation), the pressure in the fresh water collection region 106 (i.e., on the downstream side 122 of the restraint 102) can be lowered.

When the pressure initially is lowered on the downstream side 122 of the restraint 102, a thermodynamic hydrate stability boundary (not illustrated) will arise between the hydrate formation region 106 and the fresh water collection region 108. Along this stability boundary, the mat of hydrate 114 will be exposed to pressure and temperature conditions that cause the hydrate in the mat 114 closest to the stability boundary to dissociate. The thermodynamic stability boundary may be located somewhere within the mat of hydrate 114, at the surface of the restraint 102 against which the hydrate bears, or somewhere within the restraint 102 (the latter situation occurring particularly in cases where hydrate has penetrated into the pores of the restraint 102 during formation of the mat of hydrate 114). Under normal operating conditions, the stability boundary will be located somewhere within the mat of hydrate 114 near the restraint 102. In other words, the vessel 104, restraint 102, and temperature and pressure conditions within the apparatus 100 are configured and set such that the hydrate will be stable within the hydrate formation region 106 and will become unstable (and hence tend to dissociate) at a location somewhere within the mat of hydrate 114. (Hydrate that is not located at the stability boundary may also be unstable, but it generally will dissociate only if it is located at the free edges of the pressure-sealing layer 118.)

The "formation side" of the mat of hydrate 114 will tend to be warm because hydrate formation is exothermic. Conversely, the hydrate that is dissociating on the opposite side of the mat 114 will consume heat because hydrate dissociation is endothermic. The amount of heat produced when the hydrate forms and the amount of heat required for the hydrate to dissociate are about equal, but of opposite sign. Thus, dissociation of the hydrate will absorb heat and cool the mat of hydrate and the warm hydrate produced in the hydrate formation region 106.

However, because heat will be transported away from the system in the warmed residual brines "left over" from hydrate formation as they are removed from the system (not illustrated), as well as in the water and gas evolved during dissociation, the overall vessel 104 may act as a heat sink, especially in the immediate vicinity of the gas hydrate. Therefore, the demand for heat required to drive hydrate dissociation may exceed the rate at which heat can be provided by the exothermic formation of solid hydrate and the rate at which it will be available in the hydrate formation region 106. Thus, it may be necessary to heat the restraint 102 to a certain extent to ensure that water ice does not form and clog the restraint. This may be particularly true when dissociation rates (i.e., heat consumption rates) are fast. Conversely, it may be necessary to cool the restraint 102 to encourage hydrate growth (especially, for example, during system start-up).

Heating and/or cooling may be provided by circulating a heating or cooling fluid in tubes 126 integral with the restraint 102 or in tubes (not shown) attached to the restraint, or by any other conventional heating means such as resistance heating or heating/cooling using Pelletier thermoelectric effect or magnetocaloric devices. As illustrated in FIG. 2, tubes 126 are provided in the restraint 102 to provide passages for heating and/or cooling fluids to flow through or for the installation of heating/cooling devices. The tubes 126 are disposed between the pores 120 in the restraint 102. The tubes 126 are arranged such that they cover a substantial portion of the surface area of the restraint 102. The tubes 126 may be provided as a single, closed-loop circuit traversing substantially the entirety of the restraint 102, or they may be provided as multiple sets of tubes 126 arranged in a number of shorter heating/cooling loops such that each of the shorter loops traverses only a portion of the restraint 102. If multiple, shorter heating/cooling loops are employed, they may be selectively activated to cause portions of the restraint 102 to be selectively heated or cooled depending on localized thermodynamic conditions of the restraint 102. If solid state Pelletier thermoelectric effect or magnetocaloric devices are used to heat and/or cool the restraint 102, the tubes 112 may be formed as relatively shallow grooves or channels into which a number of the devices are installed. Alternatively, depending on the material from which the restraint 102 is made, it may be desirable to "print" or microfabricate the heating/cooling devices in a layer at or near either or both surfaces of the restraint 102. A plurality of Pelletier or magnetocaloric devices may be activated selectively so as to cause localized heating and/or cooling of the restraint 102.

Figure 3:
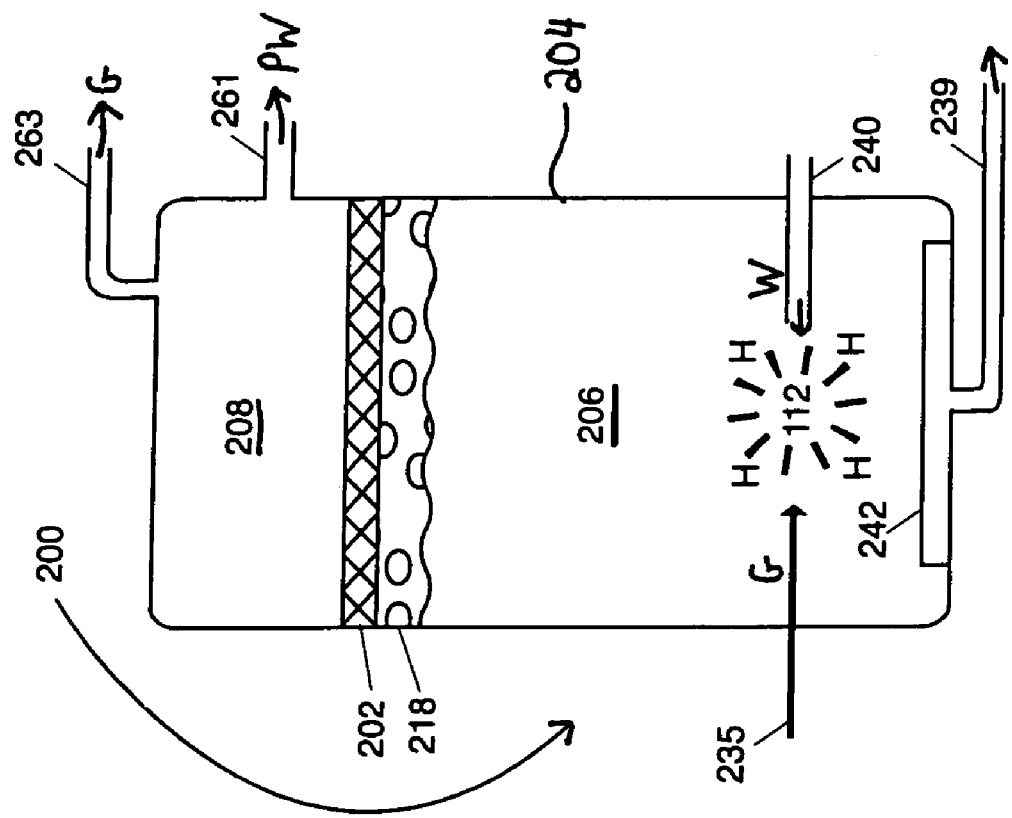
FIG. 3 is a diagrammatic section view illustrating apparatus for desalinating or purifying water using a hydrate asymmetric restraint like that shown in FIGS. 1 and 2 and using positively buoyant hydrate according to the invention.

More specific apparatus 200 for practicing the present invention is illustrated in FIG. 3. The apparatus 200 is configured to produce fresh water on a large scale using positively buoyant hydrate to do so. The apparatus 200 includes many components that are the same as or similar to those shown in apparatus 100, including a vessel 204 that is divided into a hydrate formation region 206 and a fresh water collection region 208 by means of a porous and permeable hydrate asymmetric restraint 202. The apparatus 200 is shown in FIG. 3 in steady state operation, i.e., with a pressure-sealing layer of hydrate 218 completely formed on the restraint 202.

Gas G is injected into the vessel 204 through gas supply pipeline 235. The pipeline 235 may include a manual, automatic, or remotely controlled valve or valve assembly. Input water to be treated W (i.e., purified) is supplied to the vessel 204 through input water pipeline 240, and hydrate 112 forms upon mixing of the gas G and the input water W. Residual water or brine is removed from the vessel through drain line 239. A separator 242 (e.g., a screen) is connected to the drain line 239 to prevent hydrate from being removed from the apparatus 200.

As described above in the context of FIGS. 1 and 2, hydrate will accumulate against the restraint 202 and form a hydrate mat which, upon reduction of pressure in the region 208, will dissociate into fresh water and the hydrate-forming gas, both of which pass through the restraint into region 208. Fresh product water PW is withdrawn through fresh water drain line 261, and gas G is removed through gas line 263. The recovered gas may be processed (for example, by drying and recompressing) before it is used in another cycle of hydrate formation or before it is passed on to another user for other purposes.

The gas typically is dried before re-use to prevent gas hydrates from forming in the gas lines. However, if the gas is compressed and injected back into the apparatus 200 immediately, drying the gas may not be necessary because, since the gas is heated during recompression, hydrate will not likely form in the short period of time that it takes to re-inject the gas into the vessel 204. (If so desired, the compression process may be specifically designed to heat the gas to a specific temperature at which hydrates will not form.) Alternatively, if the gas is not to be re-injected into the vessel immediately, the gas lines 263 may be provided with any sort of conventional supplemental warming apparatus.

Figure 4:
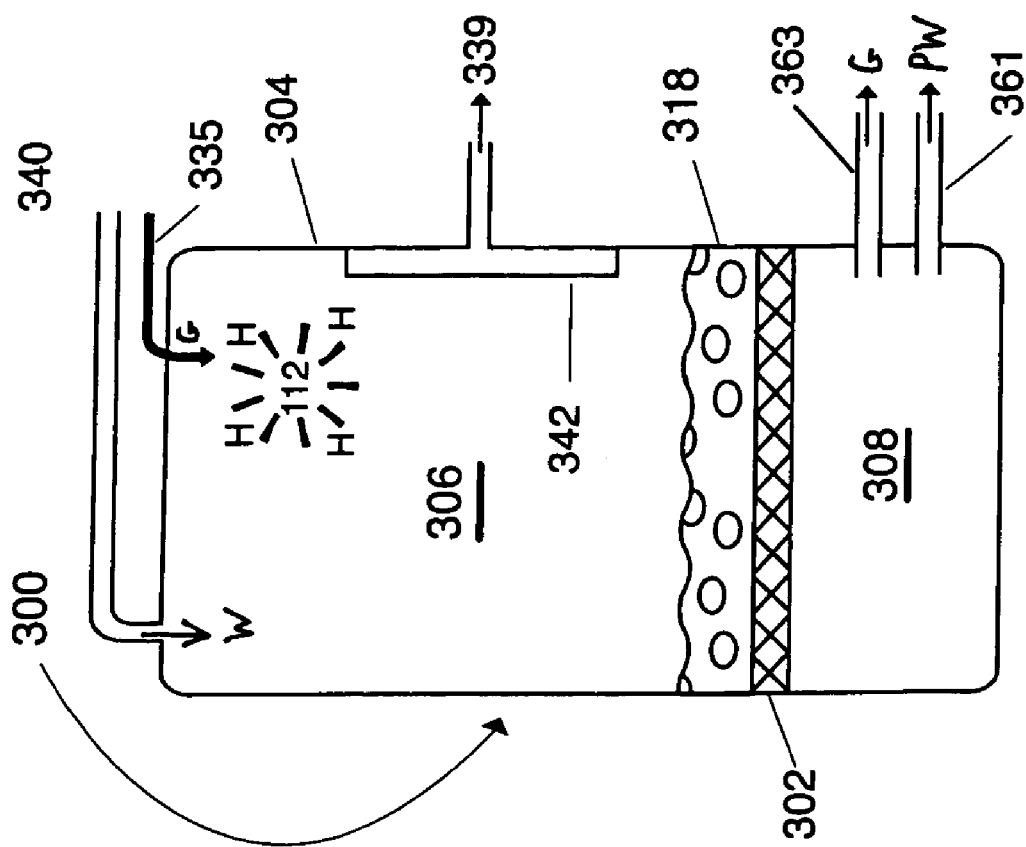
FIG. 4 is a diagrammatic section view illustrating apparatus for desalinating or purifying water using a hydrate asymmetric restraint like that shown in FIGS. 1 and 2 and using negatively buoyant hydrate according to the invention.

Another embodiment 300 of an apparatus for practicing the invention is illustrated in FIG. 4. Apparatus 300 is configured to produce fresh water on a large scale using negatively buoyant hydrate to do so. The apparatus 300 includes many components that are the same as or similar to those shown in apparatus 100 or 200, including a vessel 304 that is divided into a hydrate formation region 306 and a fresh water collection region 308 by means of a porous and permeable hydrate asymmetric restraint 302. The apparatus 300 is shown in FIG. 4 in steady state operation, i.e., with a pressure-sealing layer of hydrate 318 completely formed on the restraint 302. In contrast to apparatus 200, however, in apparatus 300, the hydrate formation region 306 is located at the top of the vessel 304, and negatively buoyant hydrate sinks downward onto the restraint 302. Thus, the pressure sealing layer 318 is formed on top of the restraint 302 in this embodiment of the invention. Hydrate will dissociate from the bottom of the hydrate mat, with fresh water and gas flowing or being drawn (by reduced pressure) down through the restraint; consequently, fresh water collection region 308 is located at the bottom of the vessel 304. Fresh product water PW is removed via drain line 361, and gas G is removed via gas line 363.

In apparatus 300, gas G is injected into the vessel 304 through gas pipeline 335. The gas pipeline 335 may include a manual, automatic, or remotely-controlled valve or valve assembly. Input water to be treated W (i.e., purified) is supplied to the vessel 304 through input water pipeline 340, and hydrate 112 spontaneously forms upon mixing of the gas G and the input water W. Residual waters or brines are removed from the vessel through drain line 339. A separator 342 (e.g., a screen) is connected to the drain line 339 to prevent solid hydrate from being removed from the apparatus 300.

In the embodiments 100, 200, and 300 illustrated in FIGS. 1–4, the freshwater collection regions 106, 206, and 306 and hydrate formation regions 108, 208, and 308 are depicted as being substantially the same size. However, in other embodiments, the fresh water collection regions 106, 206, and 306 may be smaller than the hydrate formation regions 108, 208, and 308, respectively.

Figure 5:
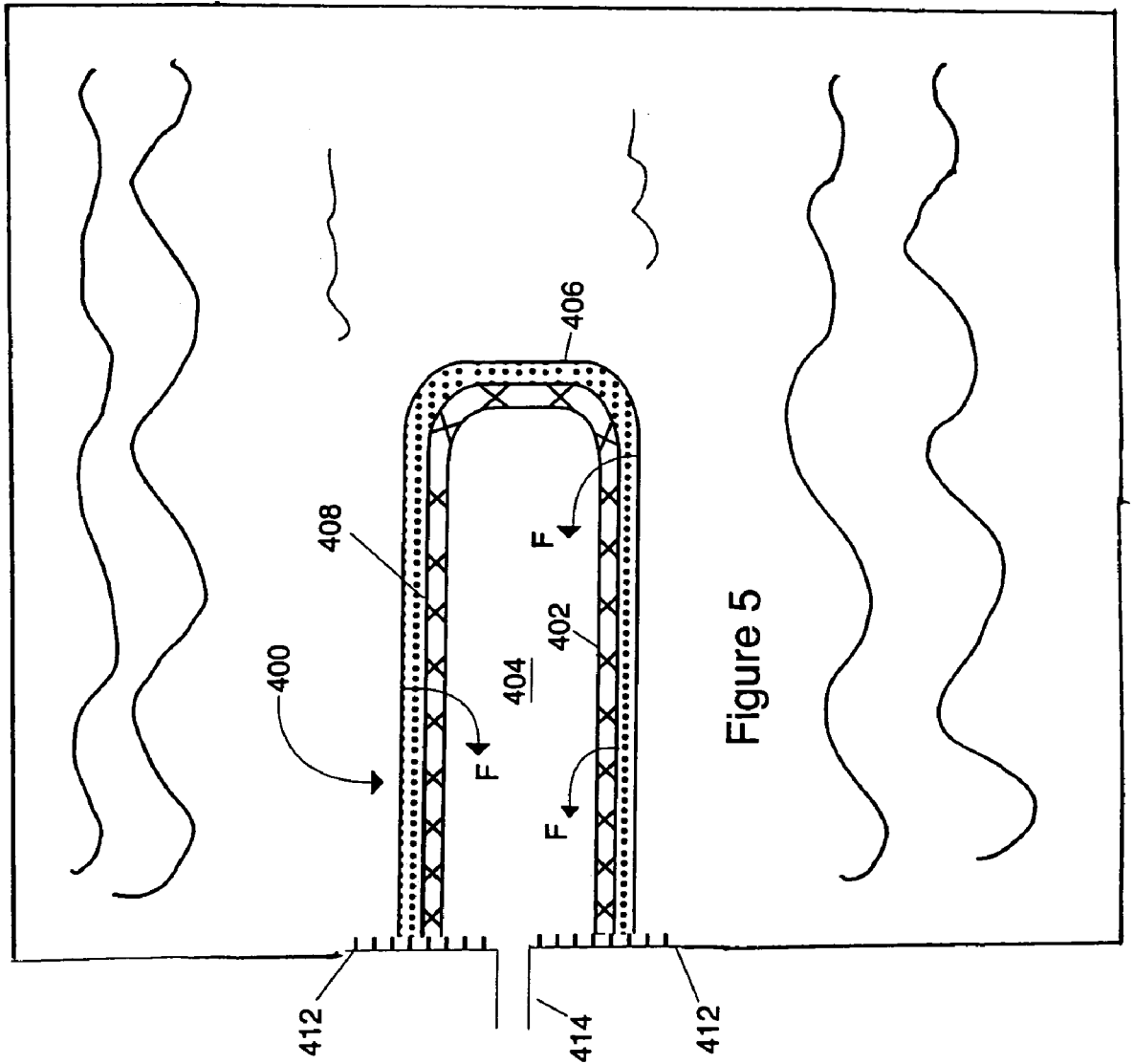
FIG. 5 is a diagrammatic section view of a contoured hydrate asymmetric restraint which can be used to practice methods of the present invention.

A hydrate asymmetric restraint according to the invention may also be contoured and may be used without a vessel, e.g., by being immersed in an aqueous saline environment as illustrated, for example, in FIG. 5. In particular, the restraint 402 in this embodiment 400 is shaped (for example, U-shaped in cross-section) so as to form an interior lumen or compartment 404 in which low-pressure hydrate dissociation conditions can be established. The restraint 402 is constructed from any of the materials noted above and may have the internal pore and tube configuration shown in FIG. 2. Hydrate (not shown) is caused to form in the body of fluid in which the contoured restraint is immersed by injecting hydrate-forming gas into the body of fluid under pressure and temperature conditions conductive to forming hydrate so as to cause hydrate to form generally in the vicinity of the contoured restraint. A pressure-sealing mat of hydrate 406 is induced to form on the exterior surface 408 of the restraint 402; pressure inside the compartment 404 is lowered; and hydrate adjacent to the exterior surface 408 of the restraint 402 dissociates, thereby allowing gas and fresh water released by the dissociating hydrate to flow (or be drawn by the reduced pressure) into the compartment 404, i.e., in the direction indicated by arrows F.

The open end of the compartment 404 is sealed by a plate 412 or other structure, and fresh water and gas are drawn out through pipe 414 connected to the plate 412. The extracted fresh water and gas are then transferred to a vessel downstream (not shown), where they are separated. As in the embodiments 100, 200, and 300 described above, the restraint 402 may be heated or cooled to induce hydrate formation or to maintain the rates of hydrate formation and dissociation at desired levels.

Advantageously, a contoured restraint such as restraint 402 provides a larger surface area on which hydrate accumulates and dissociates than a substantially flat restraint of similar widthwise dimensions. Therefore, using a contoured asymmetric restraint 402 may increase the efficiency or throughput of a water purification (or other liquid separation) process. Additionally, using a larger restraint facilitates heat transfer and may reduce the need to balance the heat demand of dissociation.

Figure 6:
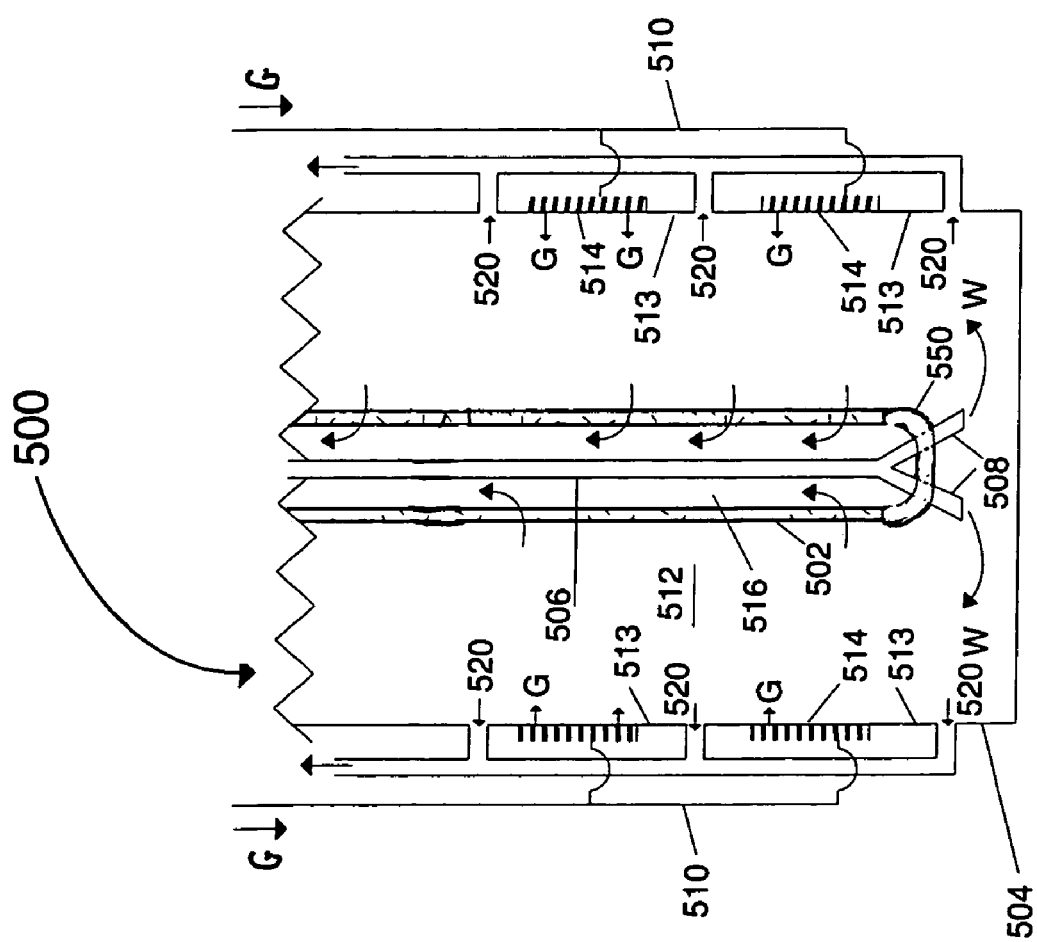
FIG. 6 is a diagrammatic section view illustrating apparatus using a contoured hydrate asymmetric restraint similar to that illustrated in FIG. 5 and configured to desalinate or purify water using positively buoyant hydrate according to the invention.

A more specific water purification system 500 which uses a contoured hydrate asymmetric restraint 502 and hydrate that is less dense than the saltwater from which it forms (i.e., which is positively buoyant) is illustrated in FIG. 6. The restraint 502 is generally U-shaped in cross-section and is immersed in a vessel 504 such that the restraint 502 is positioned substantially in the center of the vessel 504. The restraint 502 includes a non-porous endcap portion 550, which constitutes the portion of the restraint 502 having the most significant curvature. The curvature of the endcap portion 550 may affect the strain field in a mat of hydrate that forms on it and thus may change the manner in which that mat of hydrate forms and dissociates. However, because endcap portion 550 is non-porous, and therefore fresh water and gas do not pass through it, any localized differences in hydrate formation and dissociation on the endcap portion 550 will not affect the overall desalination or separation process. Therefore, if hydrate forms on the endcap portion 550, it may simply be allowed to accumulate.

A centrally located water injection pipe 506 supplies water to be treated into the vessel 504, which water to be treated exits the water injection pipe 506 via injectors 508 that are located away from the center of the vessel 504. As illustrated, the water injection pipe 506 extends through the interior compartment or lumen 516 of the contoured restraint 502. The injectors 508 may be nozzles designed to provide a specific water velocity and direction that will form a hydrocyclone (i.e., a high-speed, rotating watermass that introduces centrifugal forces), or they may simply be unmodified ends of the water injection pipe 506.

Gas supply apparatuses 510 line the walls of the vessel 504. The gas supply apparatuses 510 include panels 513 which each have a plurality of nozzles or slots 514 through which hydrate-forming gas G is supplied to the interior of the vessel 512. The angles of the gas nozzles 514 are set to optimize the amount of flow turbulence for hydrate formation. In apparatus 500, formation of hydrate on the restraint 502 is facilitated by rotating the water to be treated using a hydrocyclone or other conventional mechanical rotating means (not shown). In this embodiment, the water injectors 508 are used to create a hydrocyclone, but another set of jets (not shown) may also or alternatively be provided for this purpose. Rotating the water (e.g., by creating a hydrocyclone) creates centipetal acceleration, which, because the hydrate is less dense than the input saltwater, causes formed hydrate to migrate radially inward toward the restraint 502, i.e., away from the walls of the vessel 504 where it might otherwise encrust the apparatus. Unwanted residual brines in the apparatus 500, which brines remain after the hydrate forms and extracts fresh water from the saline water to be treated, are removed from the apparatus 500 at exit points 520, and dissociated gas and fresh water are collected from the top of the interior compartment 516.

The design and placement of the water injection pipe 506 provides certain thermodynamic advantages. As noted above with respect to other embodiments, fresh water released as the hydrate dissociates, which flows through the restraint 502 and into the interior compartment 516, will be cold because dissociation is an endothermic process. Because the water injection pipe 506 passes through the interior compartment 516 and is exposed to the cold fresh water, the water injection pipe 506 functions as a heat exchanger to cool the water to be treated as it flows through the water injection pipe 506 and out through the injectors 508. That is advantageous because cooling the water to be treated facilitates hydrate formation and provides a natural density gradient. Conversely, the cool, fresh, product water within the interior compartment 516 will absorb heat from the warmer water flowing through the water injection pipe 506 which, in turn, helps warm the restraint 502 and encourages hydrate encrusted on the restraint to dissociate. Although illustrated as a substantially straight pipe in FIG. 6, the water injection pipe may be coiled or contoured to increase its surface area and, consequently, its effectiveness as a heat exchanger.

Figure 7:
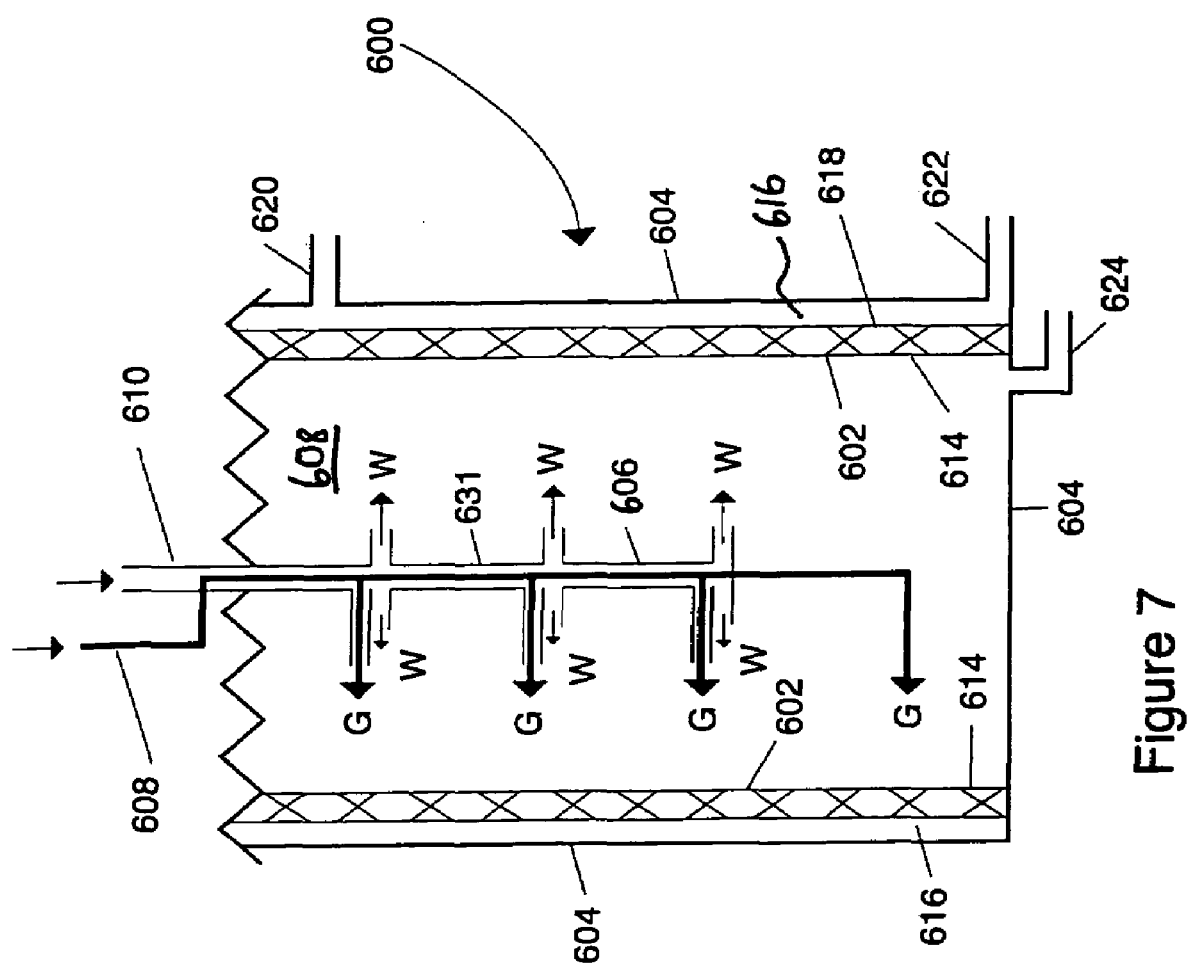
FIG. 7 is a diagrammatic section view illustrating apparatus using a contoured hydrate asymmetric restraint to desalinate or purify water using negatively buoyant hydrate according to the invention.

Another embodiment 600 of an apparatus for practicing the invention is illustrated in FIG. 7. In this apparatus 600, which is configured for use with negatively buoyant hydrate (i.e., hydrate that is more dense than the saline input water to be treated), a substantially tubular hydrate asymmetric restraint 602 is positioned within a vessel 604, with the restraint 602 being arranged generally concentrically with the vessel and sized such that it lies generally proximate to the walls of the vessel but with space therebetween as illustrated. Fresh water collection region 616 is defined between the exterior surface 618 of the restraint 602 and the interior wall of the vessel 604. Hydrate-forming gas and water to be treated are injected into the center of the vessel 604 by means of central distribution piping 606, which includes gas distribution piping 608 and water distribution piping 610. (Gas may also be delivered via gas nozzles (not shown) that extend from the walls of the vessel 604 through the restraint 602.) Water to be treated W and gas G enter the interior compartment 608 bounded by the restraint 602, and hydrate forms and accumulates on the interior surface 614 of the restraint 602. Fresh water and gas released upon dissociation of the hydrate pass radially outward through the restraint 602 and into the fresh water collection region 616. Gas removal piping 620 and fresh water removal piping 622 transport the dissociated gas and fresh water away from the water collection region 616, and brine removal pipe 624 transports unwanted residual brines from the vessel.

Similar to apparatus 500, apparatus 600 uses a hydrocyclone or other mechanical rotating means (not shown) to force the forming hydrate outward, towards the interior surface 614 of the restraint 602. In this embodiment 600, however, the hydrate migrates radially outward as the water rotates because it is more dense than the saline input water to be treated. Jets of water from the water distribution piping 610 may drive the hydrocyclone, or another set of jets (not shown) may do so. Because the embodiment 600 is configured for use with negatively buoyant hydrate, the gas distribution piping 608 should be configured to inject the hydrate-forming gas G in small bubbles such that there is little residual gas in the formed hydrates. That is because, as explained above, large amounts of residual gas in the hydrate could cause the overall hydrate masses to be positively buoyant instead of negatively buoyant. Gas should also be injected as close to the hydrate formation region as possible to prevent gas from "pooling" around the gas distribution piping 608.

Figure 8:
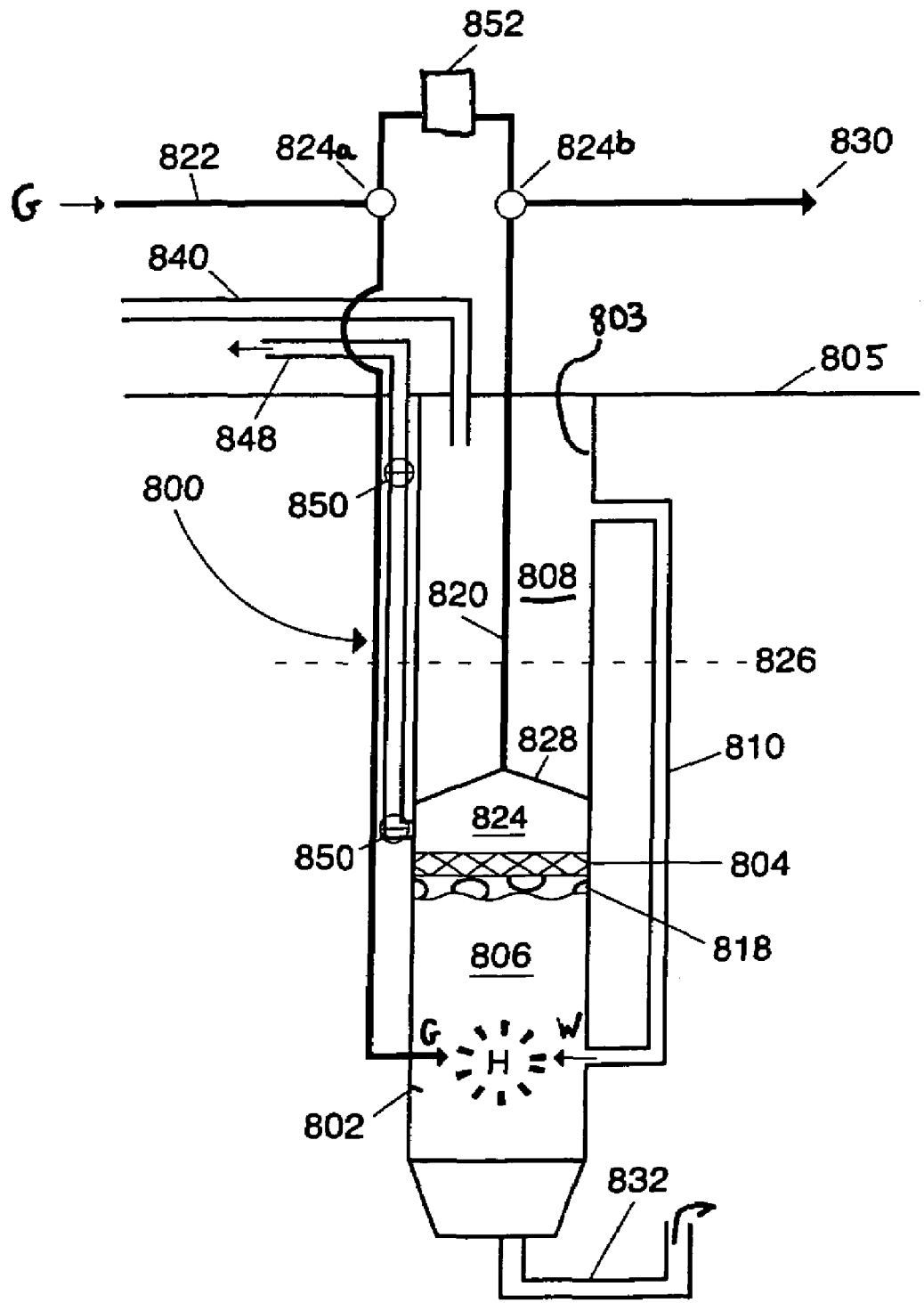
FIG. 8 is a diagrammatic section view of a shaft-based installation for desalinating or purifying water using a hydrate asymmetric restraint like that shown in FIGS. 1 and 2 and using positively buoyant hydrate according to the invention.

In the embodiments described above, the required hydrate-forming water pressures are mechanically generated within the vessels, e.g., by parametric pumping (not shown) or by any other form of mechanically-generated compression (not shown). However, water purification apparatus utilizing a hydrate asymmetric restraint may be installed in an environment which provides a column of water—either free or unbounded, as in the open ocean, or bounded or restrained, as in a shaft extending down into the ground or in a free-standing tower extending above the ground—where the weight of the water column generates sufficient pressure for hydrate to form. An example of such an embodiment 800 that is suitable for shaft installation and that is configured to be used with positively buoyant hydrate (either per se or in toto) is illustrated in FIG. 8.

The apparatus 800 is constructed in a shaft 803 extending down into the ground 805. The shaft is deep enough for the weight of a column of water of depth equal to the depth of the shaft to generate water pressure sufficient to cause hydrate to form spontaneously when hydrate-forming gas is injected into the water to be treated (assuming the water to be treated is at sufficiently low temperature).

The shaft 803 has a generally conical solid partition 828 extending across it, and the solid partition 828 divides the shaft into a lower shaft portion 802 and an upper shaft portion 808. The lower shaft portion 802 has a hydrate asymmetric restraint 804 extending across it, and the hydrate asymmetric restraint 804 is constructed from any of the materials identified above in connection with the hydrate asymmetric restraint 102 in FIG. 1. Preferably, the hydrate asymmetric restraint has an internal pore and tube configuration like that shown in FIG. 2 in connection with the hydrate asymmetric restraint 102 shown in FIG. 1. The restraint 804 divides the lower shaft portion 802 into a hydrate formation region 806 and a fresh water and gas collection region 824. A bypass pipe 810 extends from the upper shaft portion 808 to the lower shaft portion 802 (in particular, the hydrate formation region 806) and establishes open fluid communication between the upper shaft portion 808 and the lower shaft portion 802 (hydrate formation region 806).

Water input pipe 840 delivers input water to be treated to the installation 800 from a source of water to be treated (not shown). Preferably, the apparatus 800 is located relatively close to the body of water from which the water to be treated is extracted, as that should reduce pumping costs for obtaining the water to be treated. It is also advantageous if the top of the apparatus 800 (e.g., ground level 805) is at a level that is at or below the surface of the body of water from which the input water to be treated is obtained. That, too, can reduce pumping costs (e.g., by effectively creating a siphon to help draw water from the body of water from which water to be treated is obtained and to deliver it to the installation 800).

The water input pipe 840 fills the upper shaft portion 808 with water to be treated, which water to be treated flows through bypass pipe 810 and into the hydrate formation region 806. (Although the water input pipe 840 could pass directly into the bypass pipe 810 and the upper shaft portion 808 could be left unfilled ("dry"), it is easier to control system operation (e.g., water input and hydrate formation rates) when a "reservoir" from which water to be treated can be drawn and passed to the hydrate formation region, i.e., by filling the upper shaft portion 808.) Because the bypass pipe 810 establishes open fluid communication between the upper shaft portion 808 and the hydrate formation region 806, and because the upper shaft portion 808 is not pressure-sealed and therefore is in pressure balance with atmospheric pressure at its upper end, water pressure within the hydrate formation region 806 will be equal to that generated by the weight of a column of water of depth equal to that of the hydrate formation region 806 (assuming the upper shaft portion 808 is completely filled to ground level with water to be treated).

In operation, input water to be treated W is supplied to the apparatus 800 via input water pipe 840, as noted above; fills the upper shaft portion 808; flows through bypass pipe 810; and fills the hydrate formation region 806. Hydrate-forming gas is supplied to the apparatus 800 via gas input pipe 822. Gas pump/directional control unit 824a directs incoming hydrate-forming gas G received from gas input pipe 822 downward to be injected into the hydrate formation region 806. There, it mixes with the water to be treated under temperature and pressure conditions (established by the weight of the water column above the hydrate formation region) appropriate for hydrate H to form spontaneously, as indicated in FIG. 8.

Because the hydrate is positively buoyant—either because the hydrate, per se, is positively buoyant or because the hydrate, per se, is negatively buoyant but is formed in an incomplete manner such that gas bubbles trapped within hydrate shells are, in toto, positively buoyant—it will rise within the hydrate formation region 806 and accumulate along the undersurface of the hydrate asymmetric restraint 804 in the same manner as described above with respect to the embodiments shown in FIGS. 1 and 3. Highly saline residual brines remaining after the hydrate forms are removed from the apparatus 800 via brine removal pipe 832, also removing a portion of heat generated during the exothermic formation of the hydrate with it.

As is understood in the art, for a given temperature, hydrate will remain stable over a range of pressures or, in the context of water weight-induced pressures, over a range of depths. Preferably, in a shaft-based embodiment such as that illustrated in FIG. 8, the hydrate asymmetric restraint 804 is positioned well below the shallowest depth at which hydrate will remain stable for any given hydrate-forming gas expected to be used in the apparatus, i.e., significantly deeper than the hydrate stability pressure boundary 826. If desired, however, the lower shaft portion 802 and the restraint 804 may be configured so that the depth of the restraint 804 can be adjusted either up or down, e.g., by sliding or by removal and repositioning. That allows the depth of the restraint 804 to be changed as necessary to keep hydrate at a pressure-depth at which gas hydrate will form and remain stable for any given hydrate-forming gas or gas mixture that is used with the apparatus. Preferably, the restraint 804 is located sufficiently below the hydrate stability boundary 826 for hydrate to form relatively rapidly. (As is known in the art, for a given temperature, the rate at which hydrate forms tends to decrease as the pressure depth of the region where hydrate is formed approaches the pressure-depth of the hydrate stability pressure boundary 826.)

The embodiment 800 is illustrated in FIG. 8 under steady state operating conditions. Therefore, it is illustrated with a solid mat of hydrate 818 having accumulated over the lower surface of the restraint 805 to form a pressure seal or barrier extending across the entire cross-sectional area of the lower shaft portion 802. Under steady state operating conditions, hydrate will dissociate from the portions of the mat of hydrate 818 adjacent to the restraint 804. Purified water and gas released upon dissociation of the hydrate pass through the porous, permeable restraint 804 and into the fresh water collection region 824 located above the hydrate asymmetric restraint 804 and fresh water is removed from the fresh water collection region 824 via fresh water extraction pipe 848.

Because the solid mat of hydrate 818 and the hydrate asymmetric restraint 804 together effectively form a pressure seal or barrier across the cross-sectional area of the lower shaft portion 802, and because the restraint 804 is a flow restrictor and, as such, causes a pressure drop as water and gas flow through it, the fresh water in the fresh water collection region 824 will be at a pressure that is lower than the pressure of the input water to be treated at the same level within the bypass pipe 810. Accordingly, the level of fresh water in the fresh water extraction pipe 848 will not automatically equilibrate with the level of water in the upper shaft portion 808. Therefore, pumps 850 are provided along the length of fresh water extraction pipe 848 in order to help remove fresh water from the fresh water collection region 824.

Hydrate-forming gas which has been released upon dissociation of the hydrate, on the other hand, will bubble up to the vertex of the conical solid partition 828 and rise through gas removal pipe 820. Gas pump/directional control assembly 824b controls the flow of gas that has been released from the hydrate and that has risen through gas pipe 820. In particular, control assembly 824b directs some or all of the gas to a downstream application (e.g., to a gas-fired power station or fuel cell assembly) via gas line 830 and/or some or all of the gas to gas recycling unit 852, which reprocesses the gas by drying and/or repressurizing it for reuse in further hydrate formation cycles.

As indicated above, the hydrate asymmetric restraint 804 (and, therefore, the solid mat of hydrate 818) is located significantly below the hydrate stability pressure boundary 826. Therefore, it is necessary to reduce pressure in the fresh water collection region 824; depending on the vertical distance between the level of the restraint 804 and the hydrate stability pressure boundary 826, the amount by which the pressure in the fresh water collection region 824 needs to be reduced can be substantial. The pumps 850 in the fresh water extraction line 848 can create suction for pressure reduction within the fresh water collection region 824, and one or more pumps located in-line in the gas recovery pipe 820 will also help lower pressure within the fresh water collection region 824.

Finally, with respect to the embodiment 800 illustrated in FIG. 8, while the conical configuration of the solid partition 828, with the vertex located at the top of the partition, helps direct the released gas into the gas pipe 820 to be removed from the apparatus, that configuration also helps support the weight of the input water in the upper shaft portion 808. As explained above, the pressure within the fresh water collection region 824 will be lower than that within the bypass pipe 810 at the same depth level, which is generally the same as the pressure at the bottom of the upper shaft portion 808. Therefore, there will be a pressure differential across the solid partition acting in the downward direction, and the upwardly oriented conical shape of the solid partition 828 helps the solid partition withstand that pressure differential. (Conversely, the weight of the water in the upper shaft portion 808 counteracts pressure forces that the fresh water in fresh water collection region 824 exerts on the partition 824; that pressure counteraction is another benefit of filling the upper shaft portion 808 instead of leaving it dry.)

As noted above, apparatus 800 is specifically configured to utilize positively buoyant hydrates. However, a shaft-based apparatus may be configured with a centrifugal force-type device, as shown and described with respect to FIGS. 6 and 7, such that either positively buoyant or negatively buoyant hydrates may be used and formed on a contoured restraint. In that case, the contoured restraint would likely have significantly more surface area than the restraint 804 shown in FIG. 8. Such a configuration would also allow for a smaller hydrate formation region 812. In either case (i.e., apparatus configured for use with either positively buoyant or negatively buoyant hydrate), the restraint would be heated or cooled to facilitate hydrate formation, and may have the heat-exchanging tube configuration shown in restraint 102 in FIG. 2.

Figure 9:
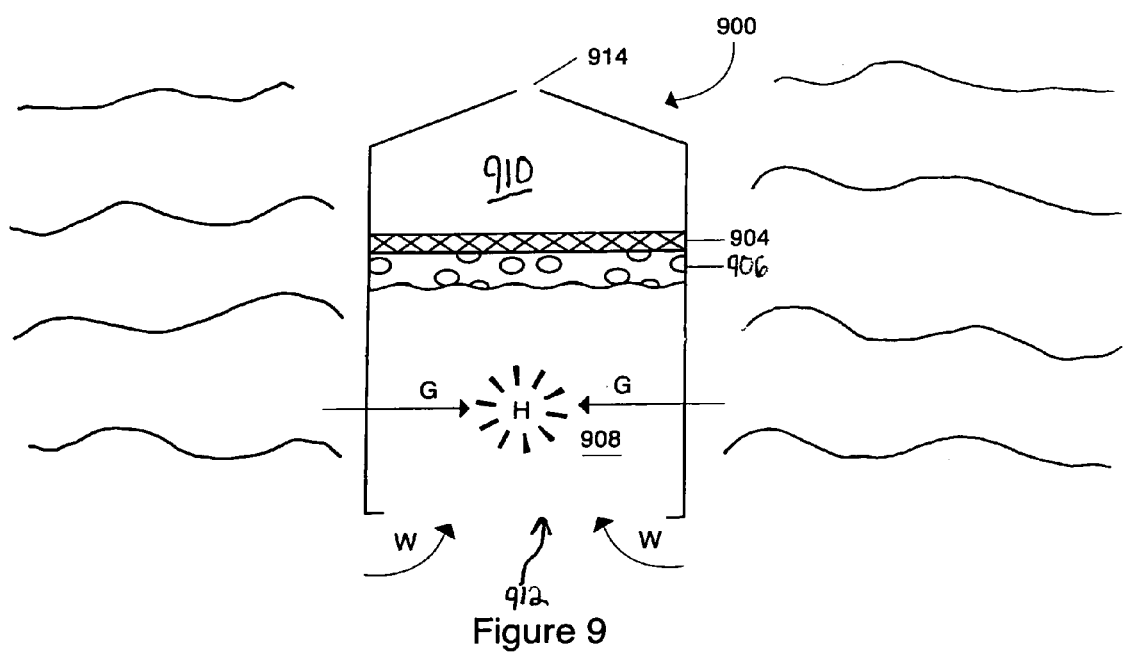
FIG. 9 is a diagrammatic section view of an apparatus used to purify or desalinate seawater using positively buoyant hydrate, which apparatus is submerged in an open-ocean environment according to the invention.

Another embodiment of the invention 900 is illustrated in FIG. 9. Apparatus 900 is submerged in a marine environment, at a pressure depth at which gas hydrates form spontaneously. Preferably, a number of apparatuses 900 are suspended from a frame that is attached to a ship or a semi-submersible platform. That way, the depth of each apparatus 900 may be individual set to provide for optimum hydrate-forming conditions.

The apparatus 900 is formed of a rigid material such as heavy plastic that has an anti-fouling coating. A restraint 904 is secured to the interior walls of apparatus 900, and apparatus 900 is illustrated as operating under steady-state conditions, i.e., with a pressure sealing layer of hydrate 906 formed on the underside of the restraint 904.

The restraint 904 and pressure sealing layer of hydrate 906 divide the apparatus 900 into a hydrate formation region 908 and a fresh water and gas collection region 910. The hydrate formation region 908 is open to the surrounding sea at its lower end. Therefore, opening 912 allows seawater (or other input water to be treated in which the apparatus 900 is submerged) to enter the hydrate formation region 908. Hydrate formation region 908 may be laterally extended to allow residual brines remaining after hydrate forms to equilibrate in temperature with respect to the surrounding seawater, which will increase the density of the residual brines and cause them to sink out through opening 912 and into the sea.

A piping system (not shown in detail) similar to that used in apparatus 800 may be used to supply hydrate-forming gas to the apparatus 900 and to remove dissociated gas and product water from apparatus 900. Piping to remove dissociated gas and product water (again, not shown) will be connected to port 914, and the water removal pipe will extend further into the fresh water and gas collection region 910 than the gas collection pipe. Fresh water and gas collection region 910 may be extended laterally to allow the collected fresh product water and gas to equilibrate in temperature with the surrounding seawater. Collected fresh product water and gas may be pumped directly to the surface or, if a number of apparatuses 900 are used simultaneously, the fresh water and gas may be collected in a number of smaller riser pipes before passing to the surface.

Figure 10:
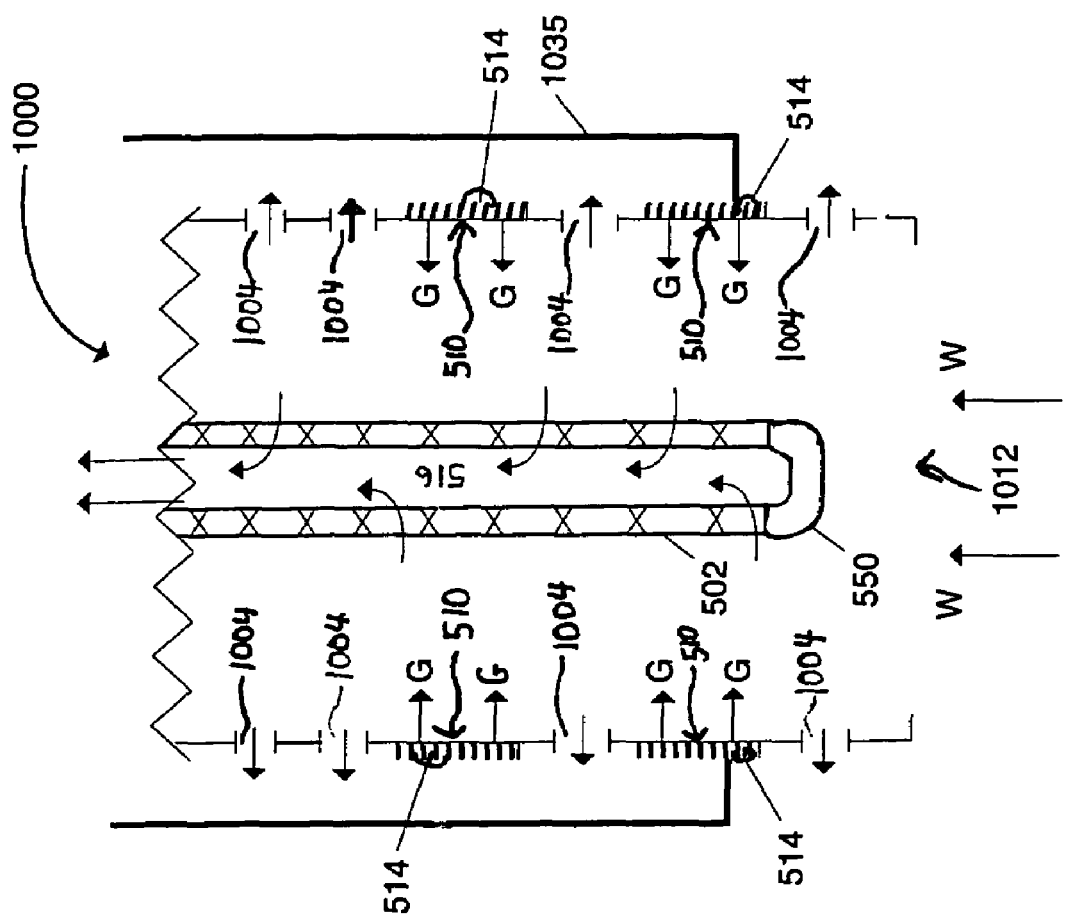
FIG. 10 is a diagrammatic section view of an apparatus for desalinating or purifying water in a submerged, open-ocean environment according to the invention, which apparatus has a contoured hydrate asymmetric restraint like that shown in FIG. 6 and an open-ended configuration like that shown in FIG. 9.

Another embodiment of the invention 1000 for marine applications is illustrated in FIG. 10. The embodiment 1000 "combines" features of embodiment 500 (FIG. 6) with the open-ended features of embodiment 900 (FIG. 9). Like embodiment 500, embodiment 1000 uses a hydrocyclone or other form of rotational water movement to facilitate hydrate formation and accumulation on the restraint 502. Unlike the free-standing embodiment 500, however, embodiment 1000 is submerged at a pressure depth at which hydrate forms spontaneously. The components of embodiment 1000 that are used to supply hydrate-forming gas are essentially the same as those shown in FIG. 5. (For clarity, the top of apparatus 1000 is not shown in FIG. 10.)

Input water to be treated enters the hydrate-forming region of the apparatus from the surrounding environment through aperture 1012 and is caused to rotate to generate a hydrocyclone. Hydrate that is less dense than the seawater (i.e., that is positively buoyant) forms and accumulates on the restraint 502, and residual brines move centrifugally toward the walls of apparatus 500. In contrast to embodiment 500, in embodiment 1000, the residual brines are expelled back into the marine environment through vents 1004. The vents 1004 are relatively small in size and allow the residual brines to leave the apparatus 1000 at a relatively slow rate. This relatively slow rate of residual brine expulsion allows a stable hydrocyclone to be maintained. Once the brines are expelled, the natural difference in the buoyancy of the residual brines (which is greater after temperature equilibration) and the temperature of the residual brines (which is initially higher than that of the surrounding water) will cause the residual brines to flow away from the apparatus, even in very low-current conditions.

It should be noted that the "residual brines" created as a result of the processes described above need not be highly concentrated. In fact, the processes described above are capable of recovering significant amounts of fresh water from seawater while producing a brine that, without mixing, has a salinity and suspended solids content that is within or very close to the ranges acceptable to marine life. (Because of the relatively low cost and high efficiency of processes according to the invention as compared to conventional desalination processes, there is no need to extract all of the available fresh water from a given volume of seawater.) Therefore, an apparatus according to the invention may be employed even in areas where marine parks and other protected marine wildlife areas exist.

Embodiments of the invention may be used in non-marine environments, e.g., to separate water from other dissolved or suspended materials in environments that would not usually provide a favorable environment for hydrate formation. More specifically, a thermally assisted or refrigerated restraint may be configured and adapted to create conditions suitable for hydrate formation and can be used to perform desalination or separation processes. Hydrate formation using a thermally assisted asymmetric restraint differs slightly from the method of hydrate formation using the previously described, non-assisted restraints. In particular, whereas with the hydrate asymmetric restraints described above hydrate is formed in the aqueous environment surrounding the restraint and subsequently is deposited on or accumulates on the restraint, with a thermally assisted restraint, hydrate is induced to form directly on the restraint from an aqueous, non-aqueous, or gaseous environment such as wet gas.

Figure 11:
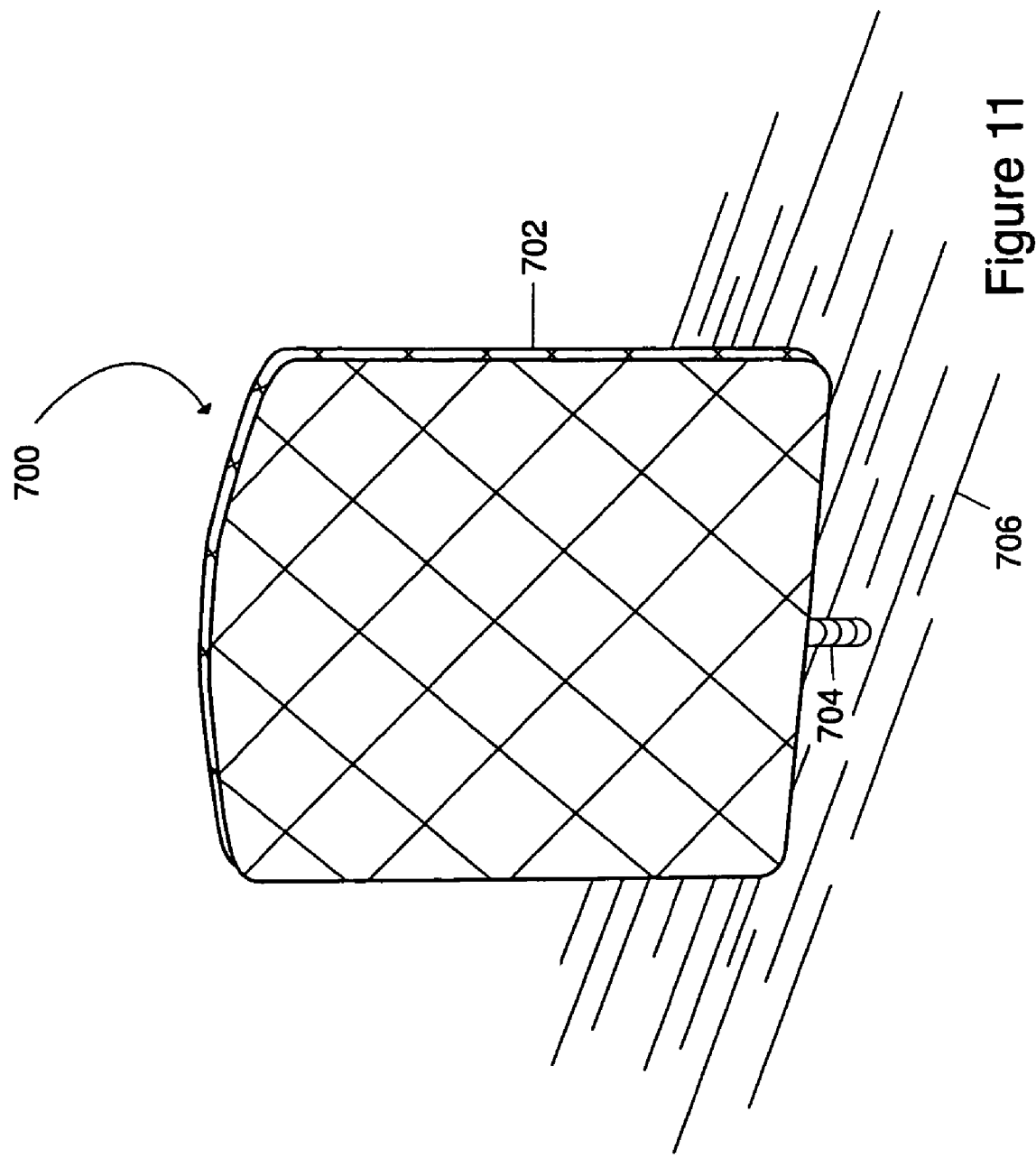
FIG. 11 is a diagrammatic perspective view of a thermally-assisted hydrate asymmetric restraint according to the invention.

FIG. 11 illustrates one embodiment 700 of a refrigerated or thermally assisted restraint. One or more such thermally assisted restraints 700 may be placed in an environment such as an aqueous environment that is maintained at appropriate hydrate-forming pressures, including in pressurized vessels, shafts, towers, or marine installations, with the number of restraints 700 used depending on the environmental conditions and desired throughput of the process.

Thermally assisted restraint 700 includes a formation portion 702, which is a contoured, porous restraint, and the general configuration of formation portion 702 is similar to that of restraint 502 of embodiment 500. Formation portion 702 has an interior structure similar to that illustrated in FIG. 2 and, in particular, includes internal tubes which are used to cool the formation portion 702 to an appropriate hydrate-forming temperature. Depending on whether a conventional refrigeration system, thermoelectric, or magnetocaloric cooling system is used, the tubes may be filled with a circulating coolant fluid or they may serve as cavities into which thermoelectric or magnetocaloric devices may be installed. A connecting pipe assembly 704 is connected to the interior compartment of the formation portion 702, and the connecting pipe assembly 704 is coupled to a port in the walls of the containing vessel 706 such that, in operation, fresh water and dissociated gas may be removed from the compartment in the formation portion 702.

When a thermally assisted restraint 700 is used to extract water from an aqueous environment, hydrate-forming gas is dissolved in the aqueous medium in which the restraint is immersed to saturated or super-saturated conditions, and hydrate is induced to form directly on the thermally assisted restraint 700 by refrigerating the restraint 700. A shroud or simple water duct may be used to control the flow of water across the restraint 700, or the restraint 700 may be specifically contoured to optimize water flow across its surface in a particular environment or vessel.

The presence of large amounts of hydrate-forming gas in the region where hydrate formation is induced promotes the growth of solid gas hydrate on the surface of the hydrate-forming portion 702 with few inclusions, and solubility gradients will cause the dissolved hydrate-forming gas to migrate toward the region in which hydrate is forming. Further, hydrate-forming gas is added into the aqueous medium at a location where temperatures are too high or pressures are too low for the formation of hydrate, and the dissolved (to saturated or supersaturated levels) hydrate-forming gas migrates toward the thermally assisted restraint 700, where it crystallizes. Additional hydrate-forming gas may be added as necessary.

The thermally assisted restraint 700 may be combined with a localized heating apparatus in an environment where "plugs" of hydrate or water ice form at unwanted locations. If a localized heating apparatus is used in combination with a thermally assisted restraint 700, the heating apparatus is used to melt the "plugs" of hydrate or water ice so that hydrate formation can be limited or restricted to the formation portion 702 of the restraint 700.

Once hydrate has formed on the surface of the formation portion 702, pressure in the interior of the formation portion 702 is lowered by an appropriate pump (not shown) that is coupled to the connecting pipe assembly 702. Hydrate that is closest to the surface of the formation portion 702 is thus caused to dissociate, and the resultant fresh water and gas are drawn through the restraint and into the interior of it. They are then withdrawn from the formation portion 702 through the connecting pipe assembly 704. The fresh water should be withdrawn at a moderate rate such that brines of extremely high salinity or mineral content do not form around the restraint 700.

Advantageously, with a thermally-assisted restraint 700, there is no need to cool an entire volume of water (when the thermally assisted restraint 700 is used in an aqueous environment) in order to form hydrate. Instead, it is only necessary to cool the volume of water that is to form hydrate, i.e., the volume of water immediately near the surface of the formation portion 702. This may result in significant cost savings. Additionally, hydrate is induced to crystallize on the formation portion 702 of the restraint 700 such that it contains essentially no included saline water, and this results in product water with very low salinity.

The thermally assisted restraint 700 may also be used for other applications in which it is desired to remove water or moisture from the environment in which the restraint 700 is immersed besides [other than] desalination. For example, a thermally assisted restraint 700 may be used to concentrate and remove dissolved or suspended solids such as metals from an aqueous solution (e.g., a metaliferous brine) if the water in the solution is used to form hydrate on the restraint 700 and is subsequently caused to dissociate through the restraint 700. In other words, the restraint is used to "draw" moisture out of the solution by using hydrate to "sequester"

it. Additionally, a thermally assisted restraint 700 may be used for processes such as sewage treatment in which removing excess water is a typical or desired first treatment step.

When the aqueous solution to be treated is a relatively dense slurry, the slurry should be agitated, thereby causing it to pass over the restraint 700 in bulk so as to prevent the slurry from dewatering near the restraint 700 and creating a barrier to further water movement. Moreover, if a gas-containing material such as sewage is used with the thermally assisted restraint 700, the gas contained in the material itself may be used, at least in part, as the hydrate-forming gas, either with or without the use of additional gas.

Alternatively, a thermally assisted restraint 700 may be used in a primarily gaseous or non-aqueous environment in which water is to be extracted from the non-aqueous or gaseous medium. One example of such a gaseous or non-aqueous environment where water often needs to be removed is in a hydrocarbon well. As is known, extracts from hydrocarbon wells may be warm or hot before or immediately following extraction, and in many cases may have a temperature in excess of 100° C. After the extracted hydrocarbons are cooled by heat exchange with the surrounding environment (e.g., seawater in the case of subsea wells), the resultant "wet" hydrocarbons, which may still be at a relatively warm temperature and in either a liquid (non-aqueous) or gaseous state depending on pressure and temperature conditions, can be dewatered by exposing them to a thermally assisted restraint 700. (As will be appreciated by those having skill in the art, the water to be removed will be in either a liquid or gaseous state, depending on pressure and temperature conditions. In this regard, "dewater" is a term that will be understood by those having skill in the art as referring generically to removing $H_2O$ from a medium, regardless of whether the $H_2O$ is in a liquid or gaseous state.) Localized cooling at the surface of restraint 700 will cause hydrate to form on the formation portion 702 of the restraint 700. This restraint-based dewatering process substantially prevents hydrate formation and provides flow assurance in high-pressure pipelines and other hydrocarbon apparatus.

In certain applications where a thermally assisted restraint 700 is used, it may be desirable for hydrate formed on the restraint actually not to dissociate. For example, in a hydrocarbon dewatering process like the process described above, simply forming hydrate on the restraint 700 may be sufficient to remove water from the surrounding medium, i.e., there may be no need to cause the hydrate to dissociate. In other separation or dewatering applications in which the water content in the solution or suspension is relatively low, the dissociation process may be initiated at intervals (e.g., every few minutes or hours) in order to allow enough time for a sufficiently thick mat of hydrate to accumulate on the restraint 700 before initiating dissociation.

Another example of a situation where either no dissociation or "delayed" dissociation is preferable is when it is desired to fill a vessel as completely as possible with hydrate in a relatively short period of time. In this situation, heat may be removed from the vessel as a whole most effectively by installing within the vessel a number of thermally assisted surfaces upon which the hydrate is crystallized. This will allow the water or air courses between the thermally assisted surfaces to remain open until the vessel is nearly full of hydrate and will provide optimal circulation within the vessel as a whole during the hydrate forming event. Yet another example is a situation where a sample of solid hydrate that forms naturally upon a refrigerated surface is required to be obtained. For example, samples of hydrate may be used for carrying out thermodynamic, chemical, and/or crystallographic analyses, among other uses, which are not possible to conduct within the vessel (which may be a pipeline or other apparatus in which hydrate naturally forms).

Where dissociation is later desired or required, it may be accomplished in the manner previously described using apparatus such as that described above, e.g., a contoured, thermally assisted restraint 700 as described above, or within the vessel as a whole, in which case separation of the hydrate-forming material and the water will take place immiscibly, allowing each to be removed into separate containers. Where, on the other hand, dissociation is not desired (e.g., where it is necessary or desirable to collect the hydrate as such), simplified apparatus can be used. In particular, pooling plates or panels that have a refrigeration system to cool the plates and remove heat—for example, but not limited to, a series of internal tubes or conduits, as illustrated in and described above in connection with FIG. 2—can be provided for the hydrate to form on. Such cooling plates or panels may be configured to look generally like the thermally assisted restraint 700 shown in FIG. 11, but they need not be (and preferably are not) porous, and they preferably are not contoured (i.e., they preferably do not have an interior lumen, chamber, or cavity).

Figure 12:
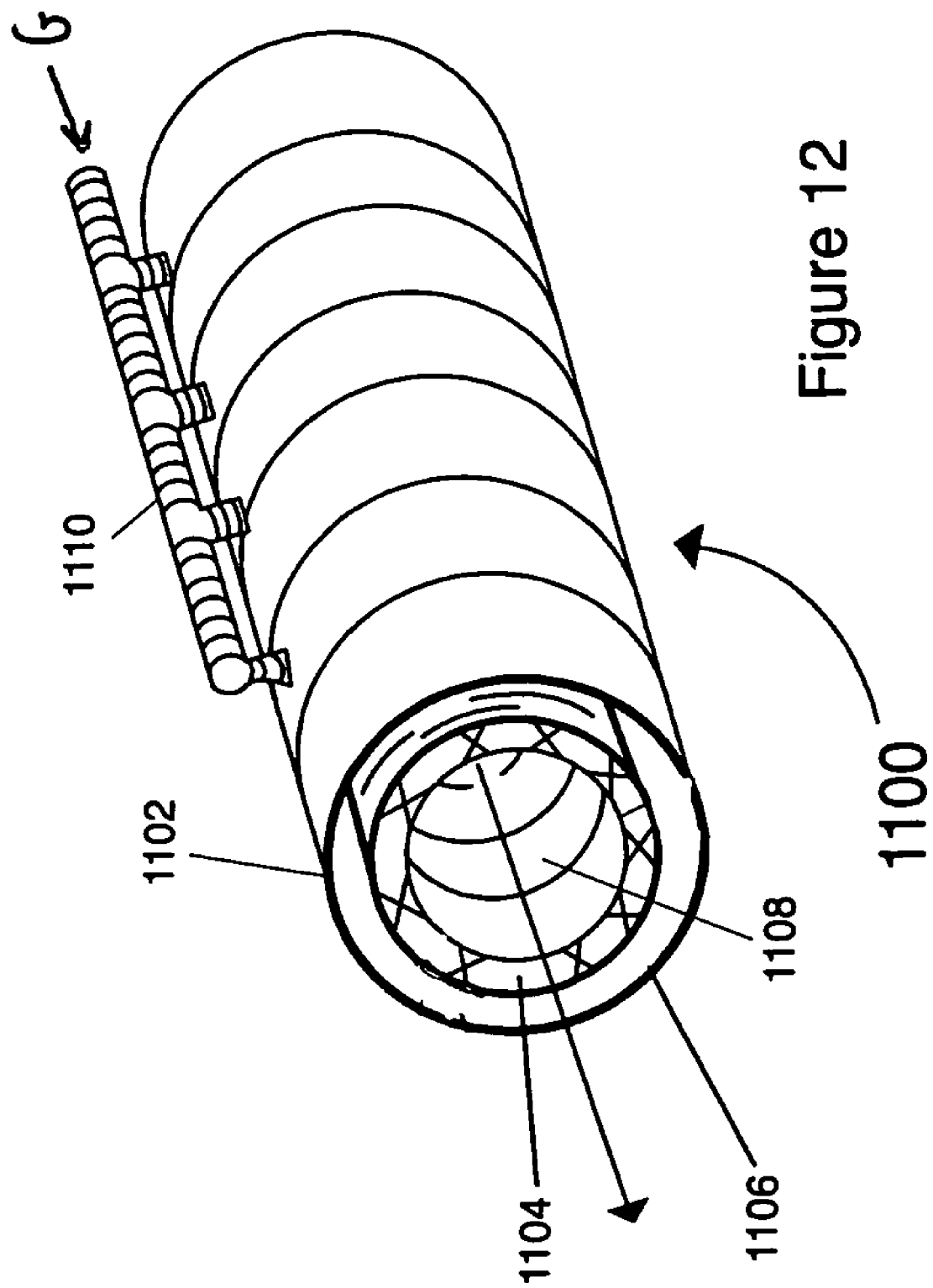
FIG. 12 is a diagrammatic perspective view of a pipe-based hydrate asymmetric restraint according to the invention.

Further embodiments of a thermally assisted restraint may be contoured and adapted for installation in specific locations. For example, a contoured, thermally assisted restraint assembly 1100 which is installed within a pipe 1102 is illustrated in FIG. 12. The assembly 1100 includes a substantially cylindrical, thermally assisted restraint 1104 mounted concentrically within the pipe 1102. The diameter of the restraint 1104 relative to that of the pipe 1102 may vary with the particular installation, although for purposes of illustration, the diameter of the restraint 1104 is shown as relatively large with respect to that of the pipe 1102.

The restraint 1104 divides the pipe 1102 into a radially outer compartment 1106, defined between the outer surface of the restraint 1104 and the inner surface of the pipe 1102, and a radially inner compartment 1108, which is located in the interior of the restraint 1104.

With the apparatus 1100, either the outer compartment 1106 or the inner compartment 1108 can function as the hydrate formation region. However, it is advantageous for hydrate to be formed on the outer surface of the restraint 1104, i.e., the surface bounding the outer compartment 1106, because, with such arrangement, the pressure-sealing layer of hydrate (not shown) naturally crushes inward toward the inner compartment 1108, which helps to maintain the pressure seal.

In operation, relatively high temperature water is pumped through the outer compartment 1106. Hydrate-forming gas is injected into the apparatus by gas injection assembly 1110, which is mounted on an exterior surface of the pipe 1102, and the thermally assisted restraint 1104 is cooled, thereby causing hydrate to form and accumulate on the restraint 1104 in the outer compartment. Pressure in the inner compartment 1108 is subsequently lowered, thereby causing inner portions of the hydrate on the restraint 1104 to dissociate and the resulting water and gas to enter the inner compartment 1108. The dissociated water and gas flow within the inner compartment 1108 and may be removed at appropriate collection points along the pipe 1102 (not shown in FIG. 12).

Figure 13:
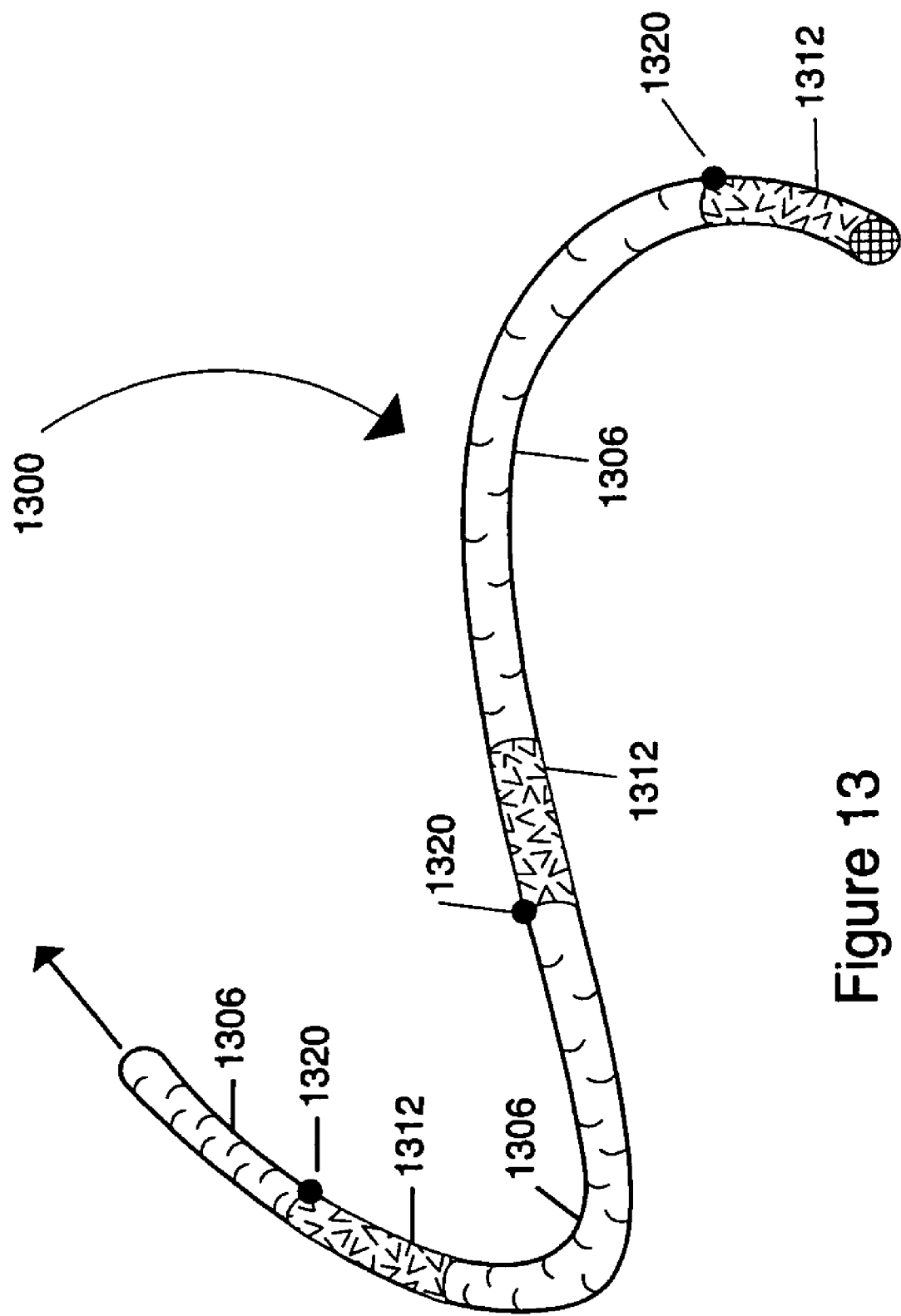
FIG. 13 is a diagrammatic perspective view of apparatus configured to remove hydrate from hydrocarbon pipelines according to the invention.

In addition to desalination or other water purification applications, embodiments of the invention may also be used to remove hydrate from pipelines. For example, hydrate removal apparatus 1300 shown in FIG. 13 consists of a series of segments of flexible piping 1306 with a thermally assisted restraint assembly 1312 positioned on one end or, as shown, with other restraint assembly segments 1312 along its length. The apparatus 1300 may also include a number of high-frequency acoustic sources 1320 of the same or different frequencies. Once the apparatus 1300 has been inserted into a hydrocarbon pipeline (not shown), the acoustic sources 1320 allow the apparatus 1300 to be located within the pipeline using known hydrophone or microphone triangulation techniques.

Figure 14:
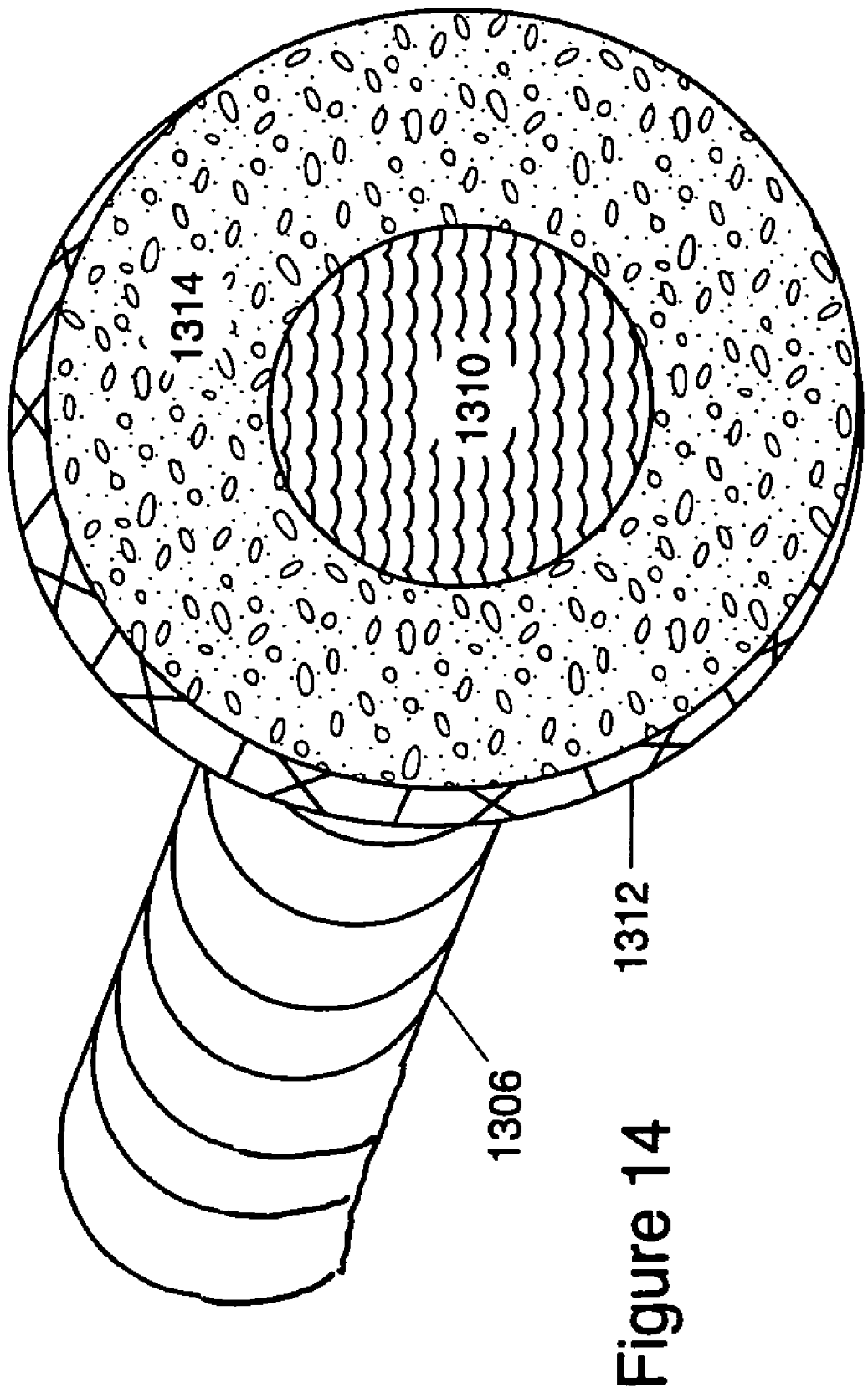
FIG. 14 is a detailed diagrammatic perspective view of a hydrate asymmetric restraint used in the embodiment of FIG. 13.

One end of the apparatus 1300 is shown in greater detail in FIG. 14. A restraint assembly 1312 is mounted on the outer surface of a segment of flexible pipe 1306. The restraint assembly 1312 is constructed such that hydrate can form on an end face 1314 of the restraint 1312 and can then dissociate into an interior cavity of the restraint (not illustrated). The interior cavity of the restraint communicates with the flexible piping 1306 such that dissociated water can be removed through the flexible piping 1306.

When hydrate has formed in a pipeline or other vessel from which it is desired to be removed, the apparatus 1300 is inserted into the pipeline or other vessel. In order to remove a hydrate "plug" from a pipeline or other vessel, it is usually necessary to melt the hydrate in situ. Therefore, apparatus 1300 includes at least one heater element 1310 to melt such unwanted hydrate "plugs." The heater 1310 may be any type of conventional heater such as a resistance element heater, thermoelectric heater, or convection-type heating element. However, it is preferable that the heater 1310 be activated in a controlled or directional manner so as to conserve energy and to avoid heating the medium unnecessarily. Accordingly, one particularly advantageous type of heater 1310 is a focused microwave heater tuned specifically to provide power output at a frequency suitable for heating water molecules.

Apparatus 1300 may be used in combination with a remotely operated vehicle (ROV) which is either tethered or autonomous. The ROV would include at least one apparatus 1300, as well as pumps for maintaining the pressure in the dissociation regions of the restraints 1316, power supplies for the heater 1310, and tanks to store dissociated water. The ROV would also include an appropriate propulsion system and, preferably, a sensing and visualization system. The sensing and visualization system of the ROV may be visual, acoustic, or infrared, depending on the medium and the particular ROV that is used. An ROV equipped with an apparatus 1300 could be inserted into a vessel or a pipeline to autonomously or semi-autonomously remove hydrate deposits within the pipeline or vessel and could be removed from the pipeline or vessel from time to time to allow its tanks to be drained and other systems to be maintained.

Finally, asymmetric restraint-based separation and purification processes and apparatuses may also be used with other clathrates, many types of which are known. (Gas hydrates are simply a particular class or species of clathrate, in which water acts as the "host" molecule and the hydrate-forming gas acts as the "guest" molecule.) For example, phenol will form clathrates with many types of guest molecules, including hydrogen sulfide, sulfur dioxide, carbon dioxide, carbon disulfide, hydrogen chloride, hydrogen bromide, methylene chloride, vinyl chloride, and xenon. Urea will form clathrates with a variety of linear organic compounds. Thiourea will form clathrates with linear and branched organic compounds.

If other clathrates are used with asymmetric restraints, the process temperatures may be higher than the process temperatures for gas hydrates. For example, phenol, urea, and thiourea are solids at ambient temperature with melting points of 40° C., 133° C., and 182° C., respectively. Therefore, using one of these compounds as the clathrate host molecule, the process temperature would bee maintained at a temperature higher than the melting point of the host molecule such that the host molecule dissociates from the guest molecule and flows through the restraint. A thermally assisted restraint such as restraint 700 may be used to heat or cool the host/guest mixture to induce a clathrate to form on its surface; alternatively, the clathrate could be formed away from the restraint and subsequently caused to be deposited on one of its surfaces.

In a non-aqueous clathrate process, the clathrate may be formed in one of several ways. If the host molecule is in solid solution or solid form and is soluble in a solution of the guest molecule, the host molecule or a solid solution containing the host molecule may be dissolved in the guest molecule solution, thereby causing clathrate to form. In other cases, the mixture of host and guest molecules may be heated while the host molecule is dissolving in the guest molecule solution. Alternatively, a solid host may be dissolved in a solvent and mixed with the guest molecule.

While the invention has been described with respect to certain embodiments, modifications and variations may be made by one of ordinary skill in the art. All such modifications to and departures from the disclosed embodiments are deemed to be within the scope of the following claims.

The invention claimed is:

1. Apparatus for separating components of a fluid system, said fluid system being 1) a solution comprising a solute dissolved in a solvent, 2) a suspension comprising solid material suspended within a suspension suspending fluid, or 3) an emulsion comprising liquid material suspended within an emulsion suspending fluid, said apparatus being configured to use clathrate having a crystalline structure comprising one or more guest molecules disposed within a cage structure formed from a plurality of host molecules to separate said components of said fluid system, said apparatus comprising:

a containment vessel;

a permeable restraint disposed within said containment vessel and dividing said containment vessel into a clathrate formation and/or accumulation region on one side of said permeable restraint and a collection region on an opposite side of said permeable restraint, said permeable restraint being sufficiently permeable that said host molecules and said guest molecules are able to pass through it, from said clathrate formation and/or accumulation region and into said collection region, upon dissociation of clathrate against said permeable restraint;

an inlet for introducing said fluid system into said clathrate formation and/or accumulation region;

an outlet for removing residual fluid remaining in said clathrate formation and/or accumulation region after clathrate has formed therein and/or accumulated against said permeable restraint;

means for inducing a layer of clathrate that, during operation of said apparatus, has formed on or accumulated against a side of said permeable restraint facing said clathrate formation and/or accumulation region to dissociate into said host molecules and said guest molecules such that said host molecules and said guest molecules can pass through said permeable restraint and into said collection region; and an outlet for collecting said host molecules and an outlet for collecting said guest molecules from said collection region.

2. The apparatus of claim 1, wherein said means for inducing comprises means for heating the side of said permeable restraint on which or against which said layer of clathrate has formed or accumulated.

3. The apparatus of claim 2, wherein said means for heating comprises a series of heating passages disposed within or on said permeable restraint.

4. The apparatus of claim 2, wherein said means for heating comprises resistance heaters.

5. The apparatus of claim 2, wherein said means for heating comprises Pelletier thermoelectric effect heaters.

6. The apparatus of claim 2, wherein said means for heating comprises magnetocaloric devices.

7. The apparatus of claim 1, wherein said permeable restraint has a plurality of pores extending through it from said one side thereof to said opposite side thereof.

8. The apparatus of claim 7, wherein said pores are conical, with the diameter of said pores decreasing from said one side of said permeable restraint to said opposite side of said permeable restraint.

9. The apparatus of claim 7, wherein said means for inducing comprises means for reducing pressure within said collection region during operation of said apparatus, the reduced pressure within said collection region acting on said layer of hydrate through said pores.

10. The apparatus of claim 9, wherein said means for reducing pressure comprises one or more pressure-reducing pumps.

11. The apparatus of claim 9, wherein said means for reducing pressure comprises one or more pumps disposed in fluid communication with said collection region via said outlet for collecting said host molecules.

12. The apparatus of claim 9, wherein said means for reducing pressure comprises one or more pumps disposed in fluid communication with said collection region via said outlet for collecting said guest molecules.

13. The apparatus of claim 1, wherein said permeable restraint comprises a cooling system.

14. The apparatus of claim 13, wherein said cooling system comprises a plurality of cooling passages extending through said permeable restraint.

15. The apparatus of claim 14, wherein said cooling passages circulate cooling fluid therein.

16. The apparatus of claim 14, wherein said cooling passages contain Pelletier thermoelectric effect cooling members.

17. The apparatus of claim 14, wherein said cooling passages contain magnetocaloric effect cooling devices.

18. The apparatus of claim 1, wherein said permeable restraint has a plurality of pores extending through it from said one side thereof to said opposite side thereof and wherein said permeable restraint comprises a cooling system comprising a plurality of cooling passages extending through said restraint, said cooling passages being arranged so as to extend in between said plurality of pores and generally parallel with the sides of said permeable restraint.

19. The apparatus of claim 1, wherein said permeable restraint comprises a heating system.

20. The apparatus of claim 19, wherein said heating system comprises a plurality of heating passages extending through said permeable restraint.

21. The apparatus of claim 20, wherein said heating passages circulate heating fluid therein.

22. The apparatus of claim 20, wherein said heating passages have resistance heaters disposed therein.

23. The apparatus of claim 20, wherein said heating passages have Pelletier thermoelectric effect heaters disposed therein.

24. The apparatus of claim 20, wherein said heating passages have magnetocaloric heaters disposed therein.

25. The apparatus of claim 1, wherein said permeable restraint has a plurality of pores extending through it from said one side thereof to said opposite side thereof and wherein said permeable restraint comprises a heating system comprising a plurality of heating passages extending through said restraint, said heating passages being arranged so as to extend in between said plurality of pores and generally parallel with the sides of said permeable restraint.

26. The apparatus of claim 1, wherein said apparatus is configured such that said clathrate formation and/or accumulation region and said collection region are vertically disposed relative to each other.

27. The apparatus of claim 26, wherein said permeable restraint is generally planar and horizontally oriented and wherein said permeable restraint extends across said containment vessel to divide said containment vessel into said clathrate formation and/or accumulation region and said collection region.

28. The apparatus of claim 26, wherein said clathrate formation and/or accumulation region is disposed above said collection region and wherein said apparatus is configured for use with negatively buoyant clathrate which sinks or settles toward said permeable restraint to form said layer of clathrate.

29. The apparatus of claim 26, wherein said clathrate formation and/or accumulation region is disposed below said collection region and wherein said apparatus is configured for use with positively buoyant clathrate which rises toward said permeable restraint to form said layer of clathrate.

30. The apparatus of claim 1, wherein said permeable restraint is a contoured restraint which has an interior lumen or compartment formed therein and wherein during operation of the apparatus, said permeable restraint is immersed in and surrounded by said fluid system 1) with the region of space exterior to said permeable restraint and bounded at least in part by walls of said containment vessel forming said clathrate formation and/or accumulation region; and 2) with said interior lumen or compartment forming said collection region.

31. The apparatus of claim 30, wherein said clathrate formation and/or accumulation region is generally cylindrical and said permeable restraint is generally centrally and coaxially disposed within said containment vessel.

32. The apparatus of claim 30, further comprising a conduit extending through the interior lumen or compartment of said permeable restraint and having one or more fluid system outlets disposed exteriorly to said permeable restraint, wherein said inlet for introducing said fluid system into said clathrate formation and/or accumulation region comprises said one or more fluid system outlets.

33. The apparatus of claim 32, wherein said one or more fluid system outlets is or are configured to cause fluid system disposed within said clathrate formation and/or accumulation region to rotate within said clathrate formation and/or accumulation region during operation of said apparatus, said apparatus being configured for use with clathrate that is positively buoyant relative to said fluid system such that as said fluid system rotates within said clathrate formation and/or accumulation region, centrifugal forces cause said fluid system to migrate radially outwardly and said clathrate to migrate radially inwardly toward said permeable restraint.

34. The apparatus of claim 1, wherein said permeable restraint is a contoured restraint which has a lumen or compartment formed therein and wherein during operation of the apparatus, said permeable restraint surrounds said fluid system with said lumen or compartment forming said clathrate formation and/or accumulation region and the region of space exterior to said permeable restraint and bounded at least in part by walls of said containment vessel forming said collection region.

35. The apparatus of claim 34, wherein said lumen or compartment, and hence said clathrate formation and/or accumulation region, is generally cylindrical and said permeable restraint is generally radially outwardly and coaxially disposed within said containment vessel.

36. The apparatus of claim 34, further comprising a conduit extending into the interior lumen or compartment of said permeable restraint and having one or more fluid system outlets disposed interiorly to said permeable restraint, wherein said inlet for introducing said fluid system into said clathrate formation and/or accumulation region comprises said one or more fluid system outlets.

37. The apparatus of claim 36, wherein said one or more fluid system outlets is or are configured to cause fluid system disposed within said clathrate formation and/or accumulation region to rotate within said clathrate formation and/or accumulation region during operation of said apparatus, said apparatus being configured for use with clathrate that is negatively buoyant relative to said fluid system such that as said fluid system rotates within said clathrate formation and/or accumulation region, centrifugal forces cause said fluid system to migrate radially inwardly and said clathrate to migrate radially outwardly toward said permeable restraint.

38. The apparatus of claim 1, wherein said containment vessel comprises a pressure vessel which is pressurizeable to pressure conditions within said clathrate formation and/or accumulation region that are conducive to formation of/and or to maintenance of stability of clathrate within said clathrate formation and/or accumulation region.

39. The apparatus of claim 1, wherein said containment vessel is disposed at a lower region of a shaft, said shaft having a length sufficient for the weight of a column of said fluid system of the same length as said shaft to generate pressure conditions within said clathrate formation and/or accumulation region that are conducive to formation of and/or maintenance of stability of clathrate within said clathrate formation and/or accumulation region.

40. The apparatus of claim 39, wherein said shaft extends down into the ground.

41. The apparatus of claim 39, wherein said shaft has a solid, sealing partition extending across it and said containment vessel is defined between said solid, sealing partition and a bottom portion of said shaft.

42. The apparatus of claim 41, wherein said collection region is disposed between said solid, sealing partition and said permeable restraint and said clathrate formation and/or accumulation region is disposed between said permeable restraint and said bottom portion of said shaft, said apparatus being configured for use with clathrate that is positively buoyant relative to said fluid system and that rises toward and accumulates along a lower surface of said permeable restraint.

43. The apparatus of claim 41, wherein said clathrate formation and/or accumulation region is disposed between said solid, sealing partition and said permeable restraint and said collection region is disposed between said permeable restraint and said bottom portion of said shaft, said apparatus being configured for use with clathrate that is negatively buoyant relative to said fluid system and that settles or sinks toward and accumulates on an upper surface of said permeable restraint.

44. The apparatus of claim 41, wherein a portion of said shaft above said solid, sealing partition forms a reservoir portion of said shaft in which said fluid system can be held before being introduced into said clathrate formation and/or accumulation region, said apparatus further comprising a bypass pipe establishing fluid communication between said reservoir portion and said clathrate formation and/or accumulation region such that said fluid system can pass from said reservoir portion into said clathrate formation and/or accumulation region.

45. The apparatus of claim 1, wherein said apparatus is configured to be submerged in a naturally occurring body of said fluid system at a depth sufficient for the weight of a column of said fluid system above said apparatus to generate pressure conditions that are conducive to formation of and/or maintenance of stability of clathrate within said clathrate formation and/or accumulation region.

46. The apparatus of claim 45, wherein said clathrate formation and/or accumulation region is open to said naturally occurring body of said fluid system such that said fluid system naturally enters said clathrate formation and/or accumulation region.

47. The apparatus of claim 45, wherein said clathrate formation and/or accumulation region is open to said naturally occurring body of said fluid system and is configured such that residual fluids remaining after clathrate is formed in said fluid system contained within said clathrate formation and/or accumulation region sink or settle naturally out of said apparatus and into said naturally occurring body of said fluid system.

48. The apparatus of claim 45, wherein said clathrate formation and/or accumulation region is disposed at a lower portion of said apparatus and is open at a lower end thereof to said naturally occurring body of fluid system such that said fluid system naturally enters said clathrate formation and/or accumulation region through the open lower end thereof and such that residual fluids remaining after clathrate is formed in said fluid system contained within said clathrate formation and/or accumulation region sink or settle naturally out of said apparatus through the open lower end of said clathrate formation and/or accumulation region and into said naturally occurring body of said fluid system.

49. The apparatus of claim 1, wherein said outlet for collecting said host molecules and said outlet for collecting said guest molecules from said collection region comprise a single, unitary outlet by means of which both said guest molecules and said host molecules are collected.

50. The apparatus of claim 1, said apparatus further comprising a clathrate-forming-substance introducing system, said clathrate-forming-substance introducing system comprising one or more conduits configured and disposed to introduce a clathrate-forming substance into said clathrate formation and/or accumulation region, which clathrate-forming substance combines with said solvent, said suspension suspending fluid, or said emulsion suspending fluid during operation of said apparatus to form said clathrate under suitable conditions of temperature and pressure.

51. The apparatus of claim 1, wherein said means for inducing comprises means for reducing pressure within said collection region.

52. The apparatus of claim 51, wherein said means for reducing pressure comprises one or more pressure-reducing pumps.

53. Apparatus for separating components of a fluid system in which said apparatus is immersed, said fluid system being 1) a solution comprising a solute dissolved in a solvent, 2) a suspension comprising solid material suspended within a suspension suspending fluid, 3) an emulsion comprising liquid material suspended within an emulsion suspending fluid, or 4) a gaseous or non-aqueous medium with water contained therein, said apparatus being configured to use clathrate having a crystalline structure comprising one or more guest molecules disposed within a cage structure formed from a plurality of host molecules to separate said components of said fluid system, said apparatus comprising:
    a contoured, thermally assisted permeable restraint configured to form a generally enclosed interior lumen or compartment therein which comprises a collection region, said contoured, thermally assisted permeable restraint having a plurality of pores extending through it from one surface bounding said interior lumen or compartment to an opposite, exterior-facing surface thereof, said contoured, thermally assisted permeable restraint further having a cooling system configured to cool at least said opposite, exterior-facing surface so as to cool portions of said fluid system in contact with or in proximity to said opposite, exterior-facing surface to form a generally solid layer of clathrate thereon, said contoured, thermally assisted permeable restraint being sufficiently permeable that said guest molecules and said host molecules are able to pass through it and into said interior lumen or compartment upon dissociation of clathrate from portions of said layer of clathrate that are in contact with or adjacent to said exterior-facing surface of said contoured, thermally assisted permeable restraint;
    means for inducing said portions of said layer of clathrate that are in contact with or adjacent to said exterior-facing surface of said contoured, thermally assisted permeable restraint to dissociate into said host molecules and said guest molecules such that said host molecules and said guest molecules can pass through said permeable restraint and into said collection region; and
    a conduit configured and disposed to convey said guest molecules out of said interior lumen or compartment and a conduit configured and disposed to convey said host molecules out of said interior lumen or compartment after said guest molecules and said host molecules have passed through said contoured, thermally assisted permeable restraint and into said collection region.

54. The apparatus of claim 53, wherein said cooling system comprises a plurality of cooling passages extending through said permeable restraint, said cooling passages being arranged so as to extend in between said plurality of pores and generally parallel with the sides of said permeable restraint.

55. The apparatus of claim 54, wherein said cooling passages circulate cooling fluid therein.

56. The apparatus of claim 54, wherein said cooling passages contain Pelletier thermoelectric effect cooling members.

57. The apparatus of claim 54, wherein said cooling passages contain magnetocaloric effect cooling devices.

58. The apparatus of claim 53, wherein said pores are conical, with the diameter of said pores decreasing from the exterior-facing surface of said contoured, thermally assisted permeable restraint to said one surface bounding said interior lumen or compartment of said contoured, thermally assisted permeable restraint.

59. The apparatus of claim 53, wherein said means for inducing comprises means for heating said exterior-facing surface of said contoured, thermally assisted permeable restraint.

60. The apparatus of claim 59, wherein said means for heating comprises a series of heating passages disposed within or on said contoured, thermally assisted permeable restraint, said heating passages being arranged so as to extend in between said plurality of pores and generally parallel with the sides of said permeable restraint.

61. The apparatus of claim 59, wherein said means for heating comprises resistance heaters.

62. The apparatus of claim 59, wherein said means for heating comprises Pelletier thermoelectric effect heaters.

63. The apparatus of claim 59, wherein said means for heating comprises magnetocaloric devices.

64. The apparatus of claim 53, wherein said means for inducing comprises means for reducing pressure within said collection region, the reduced pressure within said collection region acting on said portions of said layer of clathrate that are in contact with or adjacent to said exterior-facing surface of said contoured, thermally assisted permeable restraint through said pores.

65. The apparatus of claim 64, wherein said means for reducing pressure comprises one or more pressure-reducing pumps.

66. The apparatus of claim 64, wherein said means for reducing pressure comprises one or more pumps disposed in fluid communication with said conduit configured and disposed to convey said guest molecules out of said interior lumen or compartment.

67. The apparatus of claim 64, wherein said means for reducing pressure comprises one or more pumps disposed in fluid communication with said conduit configured and disposed to convey said host molecules out of said interior lumen or compartment.

68. The apparatus of claim 53, wherein said conduit configured and disposed to convey said guest molecules out of said interior lumen or compartment and said conduit configured and disposed to convey said host molecules out of said interior lumen or compartment comprise a single, unitary conduit.

69. Apparatus for forming hydrate or other clathrate, comprising:
   a vessel in which components of said hydrate or clathrate can be located; and
   a permeable hydrate-formation or clathrate-formation support member disposed within said vessel, said support member having a plurality of pores of diminishing cross-sectional configuration formed through the thickness thereof and said support member having a cooling system by means of which said support member is cooled so as to facilitate formation of hydrate or clathrate on a surface thereof.

* * * * *